US012679652B2

(12) United States Patent
Zhao et al.

(10) Patent No.: US 12,679,652 B2
(45) Date of Patent: Jul. 14, 2026

(54) METHOD AND DEVICE FOR TAKING OUT AND PLACING GOODS, WAREHOUSING ROBOT AND WAREHOUSING SYSTEM

(71) Applicant: HAI ROBOTICS CO., LTD., Shenzhen (CN)

(72) Inventors: Ying Zhao, Shenzhen (CN); Jui-chun Cheng, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 531 days.

(21) Appl. No.: 18/320,374

(22) Filed: May 19, 2023

(65) Prior Publication Data

US 2023/0286751 A1     Sep. 14, 2023

Related U.S. Application Data

(63) Continuation of application No. PCT/CN2021/130470, filed on Nov. 12, 2021.

(30) Foreign Application Priority Data

Nov. 20, 2020     (CN) .......................... 202011316886.2

(51) Int. Cl.
*B65G 1/137*          (2006.01)
*B65G 1/04*           (2006.01)
          (Continued)

(52) U.S. Cl.
CPC ............. *B65G 1/1373* (2013.01); *B65G 1/04* (2013.01); *B65G 1/137* (2013.01); *B65G 1/1378* (2013.01);
          (Continued)

(58) Field of Classification Search
CPC .......... B65G 1/1373; B65G 2203/0233; B65G 1/1378; B65G 1/04; B65G 1/137; B65G 1/14; G06Q 10/087
See application file for complete search history.

(56) References Cited

U.S. PATENT DOCUMENTS 10,647,528 B1 *  5/2020  Diankov ................ B65G 47/90
2003/0110102 A1 *  6/2003  Chien .................... G06Q 10/08
                                                                                    705/28

(Continued)

FOREIGN PATENT DOCUMENTS

CN          107067206 A     8/2017
CN          108712946 A     10/2018
          (Continued)

OTHER PUBLICATIONS

CN-110615223-A (Year: 2019).*

(Continued)

*Primary Examiner* — Ernesto A Suarez
*Assistant Examiner* — Laurence R Brothers
(74) *Attorney, Agent, or Firm* — Ladas & Parry, LLP

(57)          ABSTRACT

Embodiments of the present application disclose a method and device for taking out and placing goods, a warehousing robot and a warehousing system. For the warehousing system based on a dynamic storage location storage mechanism, the method includes: moving, according to an operation instruction for target goods, to a target position, where the target position is a position corresponding to a dynamic goods storage space for the target goods; acquiring first state information and second state information, and determining, according to the first state information and the second state information, available spacing between the target goods and adjacent objects, where first state information is used for representing a spatial position feature of the target goods and the second state information is used for representing spatial (Continued)

Boundary size

R1_2     Target goods     R1_1

Spatial distance

Adjacent object B          Adjacent object A position features of the adjacent objects; and taking out or storing, according to the available spacing, the target goods.

20 Claims, 12 Drawing Sheets

(51) Int. Cl.
  *B65G 1/14*      (2006.01)
  *G06Q 10/087*   (2023.01)

(52) U.S. Cl.
  CPC ............. *B65G 1/14* (2013.01); *G06Q 10/087* (2013.01); *B65G 2203/0233* (2013.01)

(56) References Cited

U.S. PATENT DOCUMENTS

| | | | | |
|---|---|---|---|---|
| 2007/0288296 | A1* | 12/2007 | Lewis | G06Q 10/087 186/52 |
| 2012/0126000 | A1* | 5/2012 | Kunzig | G06T 7/73 235/385 |
| 2016/0167880 | A1* | 6/2016 | Pankratov | B65G 1/0492 211/26.1 |
| 2017/0369244 | A1* | 12/2017 | Battles | B65G 47/902 |
| 2018/0005446 | A1* | 1/2018 | Elazary | G06T 11/60 |
| 2019/0236531 | A1* | 8/2019 | Adato | G06Q 10/087 |
| 2020/0180862 | A1 | 6/2020 | Pankratov et al. | |
| 2020/0279217 | A1* | 9/2020 | Gravelle | B65G 1/1373 |
| 2023/0286750 | A1* | 9/2023 | Li | G05D 1/0212 |

FOREIGN PATENT DOCUMENTS

| | | | | | |
|---|---|---|---|---|---|
| CN | 110615223 | A | * 12/2019 | .......... | B65G 1/0492 |
| CN | 209739917 | U | 12/2019 | | |
| CN | 110834897 | A | 2/2020 | | |
| CN | 111348361 | A | * 6/2020 | .......... | B65G 1/1373 |
| CN | 111674817 | A | 9/2020 | | |
| CN | 111792249 | A | 10/2020 | | |
| CN | 111792259 | A | 10/2020 | | |
| CN | 111936404 | A | 11/2020 | | |
| CN | 112407729 | A | 2/2021 | | |
| JP | H08310622 | A | 11/1996 | | |

OTHER PUBLICATIONS

CN-111348361-A (Year: 2020).*

International Search Report for PCT/CN2021/130470.

Extended search report from European Patent Application No. 21893842.1 issued on Mar. 28, 2024.

* cited by examiner

Roadway               Roadway               Roadway

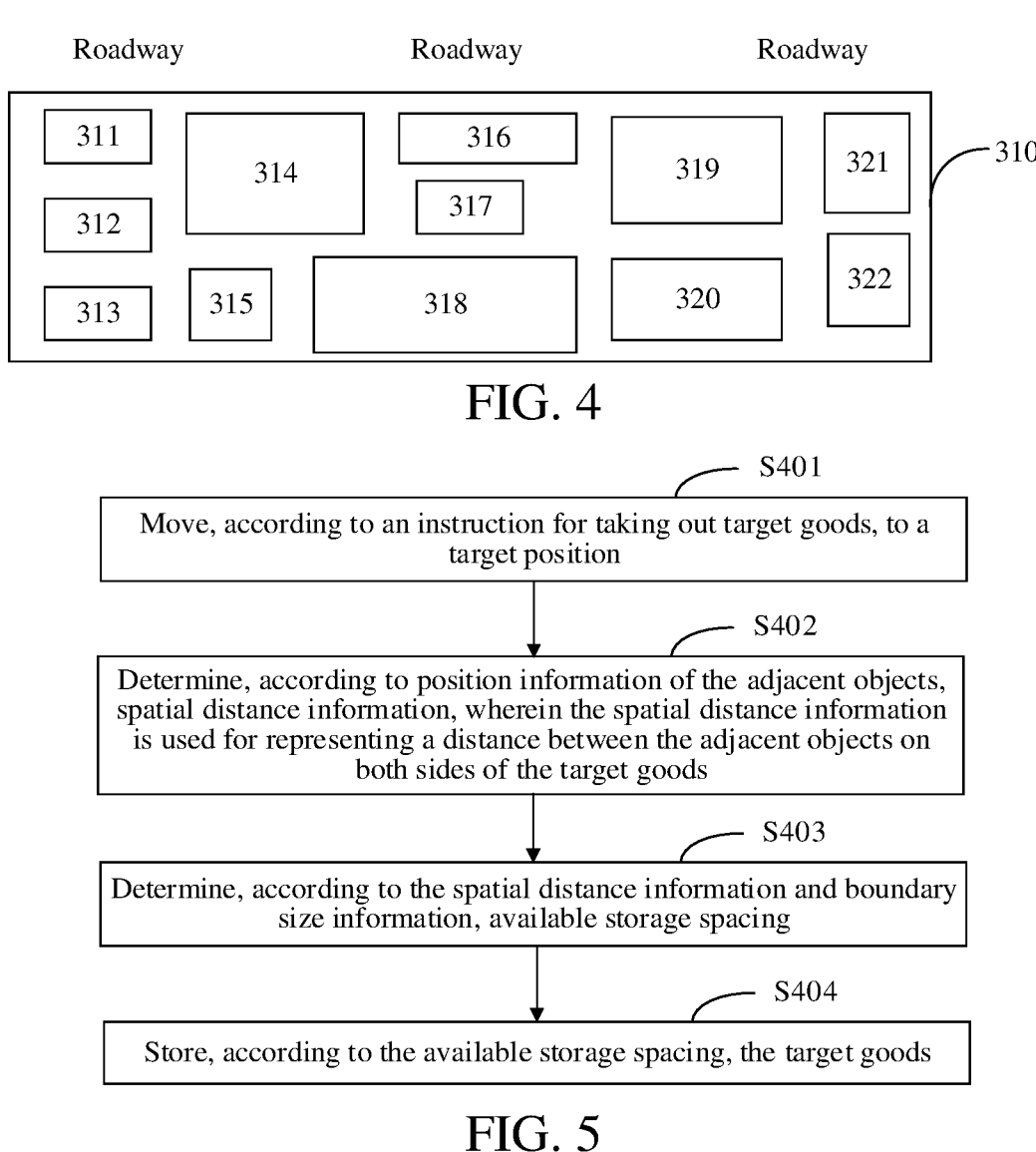

Move, according to an instruction for taking out target goods, to a target position

S402

Determine, according to position information of the adjacent objects, spatial distance information, wherein the spatial distance information is used for representing a distance between the adjacent objects on both sides of the target goods

S403

Determine, according to the spatial distance information and boundary size information, available storage spacing

S404

Store, according to the available storage spacing, the target goods

FIG. 5

Boundary size

Target goods

Spatial distance

Adjacent object B          Adjacent object A

FIG. 6

Boundary size

Target goods

R1

Spatial distance

Adjacent object B                    Adjacent object A

Boundary size

R1_2                Target goods                R1_1

Spatial distance

Adjacent object B                    Adjacent object A

S601

Move, according to an instruction for taking out target goods, to a target position

S602

Determine, according to position information of the target goods, contour position information of the target goods

S603

Determine, according to the contour position information of the target goods and position information of the adjacent objects, available take-out spacing between the target goods and the adjacent objects

S604

Adjust a position of the carrying device, and/or adjust an angle of the carrying device, and/or control a chassis of the warehousing robot to move, and control the carrying device to take out the target goods according to the first state information in a case that the available take-out spacing is greater than or equal to a take-out spacing threshold

FIG. 9

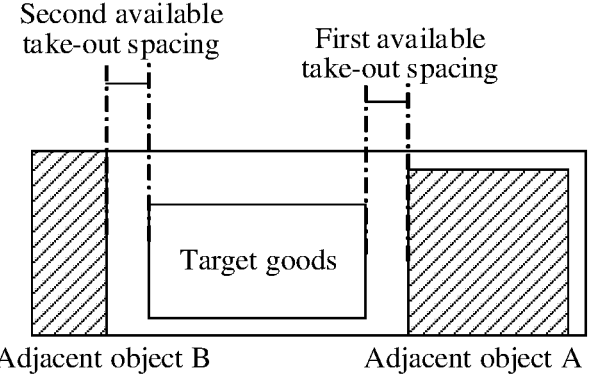

Second available take-out spacing

First available take-out spacing

Target goods

Adjacent object B          Adjacent object A

FIG. 10

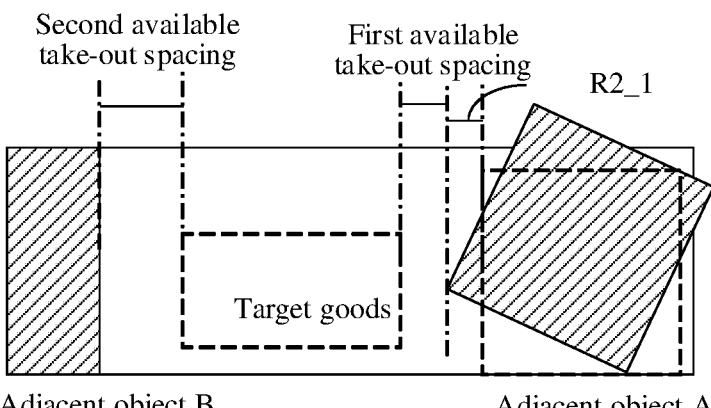

Second available take-out spacing

First available take-out spacing

R2_1

Target goods

Adjacent object B          Adjacent object A

FIG. 11

Position moving module ⌐ 810

Processing module ⌐ 820

Goods taking and placing module ⌐ 830

⌐ 910

Warehousing robot 900

Memory

⌐ 930

⌐ 920

Processor

⌐ 1020

Operation instruction

⌐ 1010

Warehousing robot

⌐ 1030

METHOD AND DEVICE FOR TAKING OUT AND PLACING GOODS, WAREHOUSING ROBOT AND WAREHOUSING SYSTEM

CROSS-REFERENCE TO RELATED APPLICATIONS

The present application is a continuation of International Patent Application No. PCT/CN2021/130470 filed on Nov. 12, 2021, which claims priority to Chinese Patent Application No. 202011316886.2 filed with the Chinese Patent Office on Nov. 20, 2020 and entitled "METHOD AND DEVICE FOR TAKING OUT AND PLACING GOODS, WAREHOUSING ROBOT AND WAREHOUSING SYS-TEM", which are incorporated herein by references in their entireties.

TECHNICAL FIELD

The present application relates to the technical field of intelligent warehousing, and in particular to a method and device for taking out and pacing goods, a warehousing robot and a warehousing system.

BACKGROUND

Intelligent warehousing systems based on warehousing robots use an intelligent operating system to automatically take out and store goods by means of system instructions, and can continuously run for 24 hours, omitting manual management and operation and improving the warehousing efficiency and thus being widely used and favored.

In the prior art, the goods are often taken out directly by the warehousing robot according to the task instructions of the warehouse management apparatus of the warehousing system, and the target goods placed at the storage location corresponding to the task instructions are taken out to the dispatching center so that the corresponding goods are sorted or delivered out of the warehouse. However, due to human errors in operation, or measurement errors of the warehousing system or warehousing robot, etc., the spacing between the target goods and their adjacent objects or stand columns can be too small, leading to damage to the target goods, the adjacent objects or even a rack when the warehousing robot is used for taking out the target goods, which results in economic losses.

SUMMARY

The present application aims to provide a method and device for taking out and placing goods, a warehousing robot and a warehousing system. Before taking out or storing goods, goods spacing is detected in advance, thereby ensuring that sufficient space is reserved for the operation of taking out or storing the goods, which improves the safety for taking out and storing the goods.

In a first aspect, the present application discloses a method for taking out and placing goods, the method being applied to a warehousing robot, the method including:

moving, according to an operation instruction for target goods, to a target position, where the target position is a position corresponding to a dynamic goods storage space for the target goods; acquiring first state information and second state information, and determining, according to the first state information and the second state information, available spacing between the target goods and adjacent objects; where the first state information is used for representing a spatial position feature of the target goods and the second state information is used for representing spatial position features of the adjacent objects; and taking out or storing, according to the available spacing, the target goods.

Based on the above technical content, for a warehousing system based on a dynamic storage location storage mechanism, the first state information and the second state information are acquired, and the available spacing is determined according to the first state information and the second state information; the target goods are taken out or stored according to the available spacing; by means of the available spacing, it can be determined whether the target goods can be stored in and taken out of the dynamic goods storage space. The safety for taking out or storing the target goods is improved.

In a possible mode of implementation, the available spacing includes available storage spacing, the available storage spacing being used for representing a spatial size available for storing the target goods at the dynamic goods storage space. The first state information includes boundary size information of the target goods and the second state information includes position information of the adjacent object. The determining, according to the first state information and the second state information, available spacing between the target goods and the adjacent objects includes: determining, according to the position information of the adjacent objects, spatial distance information, where the spatial distance information is used for representing a distance between the adjacent objects on both sides of the target goods; and determining, according to the spatial distance information and the boundary size information, the available storage spacing.

In a possible mode of implementation, the second state information further includes pose information of the adjacent objects, the pose information being used for representing placement postures of the objects. The determining, according to the position information of the adjacent objects, spatial distance information includes: determining, according to the pose information of the adjacent objects, a first spatial correction amount, the first spatial correction amount being used for representing an amount of change in a distance between the adjacent objects on both sides of the target goods caused by a change in the placement postures of the adjacent objects; and determining, according to the position information of the adjacent objects and the first spatial correction amount, the spatial distance information.

In a possible mode of implementation, the determining, according to the pose information of the adjacent objects, the first spatial correction amount includes: acquiring preset reference pose information, the reference pose information being used for representing standard placement postures of the adjacent objects; and determining, according to an amount of change of the reference pose information and the pose information of the adjacent object, the first spatial correction amount.

Optionally, the second state information further includes size information of the adjacent objects, and the determining, according to the position information of the adjacent objects, the spatial distance information includes: determining, according to the position information of the adjacent objects and the size information of the adjacent objects, contour position information of the adjacent objects on both sides of the target goods; and determining, according to the contour position information of the adjacent objects on both sides of the target goods, the spatial distance information.

In a possible mode of implementation, the storing, according to the available spacing, the target goods includes: controlling a carrying device to place the target goods at a reference position in the dynamic goods storage space in a case that the available spacing is greater than or equal to a storage spacing threshold, where the reference position is used for indicating the position of the target goods in the dynamic goods storage space such that a distance from the target goods to the adjacent objects is less than or equal to a preset distance threshold.

In a possible mode of implementation, the carrying device includes at least one or more of a telescopic arm assembly, a suction cup and a robotic arm.

In a possible mode of implementation, the available spacing includes available take-out spacing, the available take-out spacing being used for representing a spatial size available for the carrying device to take out the target goods at the dynamic goods storage space. The first state information includes position information of the target goods and the second state information includes position information of the adjacent objects. The determining, according to the first state information and the second state information, available spacing between the target goods and the adjacent objects includes: determining, according to the position information of the target goods, contour position information of the target goods; and determining, according to the contour position information of the target goods and the position information of the adjacent objects, the available take-out spacing between the target goods and the adjacent objects.

In a possible mode of implementation, the second state information further includes pose information of the adjacent objects, the determining, according to the contour position information of the target goods and the position information of the adjacent objects, the available take-out spacing between the target goods and the adjacent objects includes: determining, according to the pose information of the adjacent objects, a second spatial correction amount, the second spatial correction amount being used for representing an amount of change in a distance between the target goods and the adjacent objects caused by a change in the placement postures of the adjacent objects; determining, according to the position information of the adjacent objects and the second spatial correction amount, corrected position information of the adjacent objects; and determining, according to the corrected position information and the contour position information of the target goods, the available take-out spacing between the target goods and the adjacent object.

In a possible mode of implementation, the second state information further includes size information of the adjacent objects, and the determining, according to the contour position information and the position information of the adjacent objects, the available spacing between the target goods and the adjacent objects includes: determining, according to the position information of the adjacent objects and the size information of the adjacent objects, contour position information of the adjacent objects; and determining, according to the contour position information of the adjacent object and the contour position information of the target goods, the spatial distance information.

In a possible mode of implementation, the first state information further includes pose information of the target goods, the pose information being used for representing the placement posture of the object, and the determining, according to the contour position information of the target goods and the position information of the adjacent objects, the available take-out spacing between the target goods and the adjacent objects includes: determining, according to the pose information of the target goods, a third spatial correction amount, the third spatial correction amount being used for representing an amount of change in a distance between the target goods and the adjacent objects caused by a change in the placement posture of the target goods; determining, according to the third spatial correction amount, corrected contour position information of the target goods; and determining, according to the corrected contour position information of the target goods and the position information of the adjacent object, the available take-out spacing between the target goods and the adjacent objects.

In a possible mode of implementation, the storing, according to the available spacing, the target goods include: adjusting a position of the carrying device, and/or adjusting an angle of the carrying device, and/or controlling a chassis of the warehousing robot to move according to the first state information in a case that the available take-out spacing is greater than or equal to a take-out spacing threshold; and controlling the carrying device to take out the target goods.

In a possible mode of implementation, the carrying device includes at least one or more of a telescopic arm assembly, a suction cup and a robotic arm.

In a possible mode of implementation, the method further includes: acquiring environmental error information, the environmental error information being used for representing the effect of an environment in which the warehousing robot is located on the available spacing; and correcting, according to the environmental error information, the available spacing.

In a possible mode of implementation, the acquiring the first state information and the second state information includes: collecting sensing information at the target position by means of a sensor disposed on the warehousing robot; and performing feature recognition on the sensing information to acquire the first state information and the second state information.

In a possible mode of implementation, the sensing information includes at least one of image information, infrared ranging information, and laser ranging information.

In a possible mode of implementation, the warehousing robot includes a mobile chassis, a carrying device, a storage rack and a lifting\lowering assembly; the storage rack, the carrying device and the lifting\lowering assembly are mounted on the mobile chassis to store the goods to be stored via the storage rack so as to carry the goods to be stored to a position corresponding to a first storage space in accordance with a first storage instruction.

In a possible mode of implementation, the carrying device includes at least one or more of a telescopic arm assembly, a suction cup and a robotic arm.

In a possible mode of implementation, the carrying device includes a tray and a steering structure, the steering structure being configured to change an orientation of the goods placed on the tray.

In a second aspect, the present application discloses a device for taking out and placing goods, the device including:

a position moving module, configured to move, according to an operation instruction for target goods, to a target position, where the target position is a position corresponding to a dynamic goods storage space for the target goods;

a processing module, configured to acquire first state information and second state information, and determine, according to the first state information and the second state information, available spacing between the target goods and adjacent objects, where the first state information is used for representing a spatial position feature of the target goods and the second state information is used for representing spatial position features of the adjacent objects; and a goods taking and placing module, configured to take out or store, according to the available spacing, the target goods.

In a possible mode of implementation, the available spacing includes available storage spacing, the available storage spacing being used for representing a spatial size available for storing the target goods at the dynamic goods storage space. The first state information includes boundary size information of the target goods, the second state information includes position information of the adjacent objects, and the processing module is specifically configured to: determine, according to the position information of the adjacent objects, spatial distance information, where the spatial distance information is used for representing a distance between the adjacent objects on both sides of the target goods; and determine, according to the spatial distance information and the boundary size information, the available storage spacing.

In a possible mode of implementation, the second state information further includes pose information of the adjacent objects, the pose information being used for representing placement postures of the objects. In response to determining, according to the position information of the adjacent objects, the spatial distance information, the processing module is specifically configured to determine, according to the pose information of the adjacent objects, a first spatial correction amount, the first spatial correction amount being used for representing an amount of change in a distance between the adjacent objects on both sides of the target goods caused by a change in the placement postures of the adjacent objects; and determine, according to the position information of the adjacent objects and the first spatial correction amount, the spatial distance information.

In a possible mode of implementation, in response to determining, according to the pose information of the adjacent objects, the first spatial correction amount, the processing module is specifically configured to acquire preset reference pose information, the reference pose information being used for representing standard placement postures of the adjacent objects; and determine, according to an amount of change of the reference pose information and the pose information of the adjacent objects, the first spatial correction amount.

In a possible mode of implementation, the second state information further includes size information of the adjacent objects, and in response to determining, according to the position information of the adjacent objects, the spatial distance information, the processing module is specifically configured to determine, according to the position information of the adjacent objects and the size information of the adjacent objects, contour position information of the adjacent objects on both sides of the target goods; and determine, according to the contour position information of the adjacent objects on both sides of the target goods, the spatial distance information.

In a possible mode of implementation, the goods taking and placing module is specifically configured to control the robotic arm to place the target goods at a reference position in the dynamic goods storage space in a case that the available spacing is greater than or equal to a storage spacing threshold, where the reference position is used for indicating the position of the target goods in the dynamic goods storage space such that a distance from the target goods to the adjacent objects is less than or equal to a preset distance threshold.

In a possible mode of implementation, the available spacing includes available take-out spacing, the available take-out spacing being used for representing a spatial size available for the robotic arm to take out the target goods at the dynamic goods storage space. The first state information includes position information of the target goods and the second state information includes position information of the adjacent objects. The processing module is specifically configured to determine, according to the position information of the target goods, contour position information of the target goods; and determine, according to the contour position information of the target goods and the position information of the adjacent objects, the available take-out spacing between the target goods and the adjacent objects.

In a possible mode of implementation, the second state information further includes pose information of the adjacent objects, the pose information being used for representing the placement posture of the object, and in response to determining, according to the contour position information of the target goods and the position information of the adjacent objects, the available take-out spacing between the target goods and the adjacent objects, the processing module is specifically configured to determine, according to the pose information of the adjacent objects, a second spatial correction amount, the second spatial correction amount being used for representing an amount of change in a distance between the target goods and the adjacent objects caused by a change in the placement postures of the adjacent objects; determine, according to the position information of the adjacent objects and the second spatial correction amount, corrected position information of the adjacent objects; and determine, according to the corrected position information and the contour position information of the target goods, the available take-out spacing between the target goods and the adjacent objects.

In a possible mode of implementation, the second state information further includes size information of the adjacent objects, and in response to determining, according to the contour position information and the position information of the adjacent objects, the available spacing between the target goods and the adjacent objects, the processing module is specifically configured to determine, according to the position information of the adjacent objects and the size information of the adjacent objects, contour position information of the adjacent objects; and determine, according to the contour position information of the adjacent objects and the contour position information of the target goods, the spatial distance information.

In a possible mode of implementation, the first state information further includes pose information of the target goods, the pose information being used for representing the placement posture of the object, and in response to determining, according to the contour position information of the target goods and the position information of the adjacent objects, the available take-out spacing between the target goods and the adjacent objects, the processing module is specifically configured to determine, according to the pose information of the target goods, a third spatial correction amount, the third spatial correction amount being used for representing an amount of change in a distance between the target goods and the adjacent objects caused by a change in the placement posture of the target goods; determine, according to the third spatial correction amount, corrected contour position information of the target goods; and determine, according to the corrected contour position information of the target goods and the position information of the adjacent object, the available take-out spacing between the target goods and the adjacent objects.

In a possible mode of implementation, the goods taking and placing module is specifically configured to adjust a position of the robotic arm, and/or adjust an angle of the robotic arm, and/or control a chassis of the warehousing robot to move according to the first state information in a case that the available take-out spacing is greater than or equal to a take-out spacing threshold; and control the robotic arm to take out the target goods.

In a possible mode of implementation, the processing module is further configured to acquire environmental error information, the environmental error information being used for representing the effect of an environment in which the warehousing robot is located on the available spacing; and correct, according to the environmental error information, the available spacing.

In a possible mode of implementation, in response to acquiring the first state information and the second state information, the processing module is specifically configured to collect sensing information at the target position by means of a sensor disposed on the warehousing robot; and perform feature recognition on the sensing information to acquire the first state information and the second state information.

In a possible mode of implementation, the sensing information includes at least one of image information, infrared ranging information, and laser ranging information.

In a third aspect, the present application discloses a warehousing robot, including: a memory and at least one processor, the memory storing computer-executable instructions; the at least one processor executing the computer-executable instructions stored in the memory, so that the at least one processor executes the method for taking out and placing goods as provided in any mode of implementation corresponding to the first aspect of the present application.

In a fourth aspect, the present application discloses a warehousing system, including the warehousing robot as provided in the third aspect of the present application, a warehouse management apparatus and a rack, where the rack is configured to store target goods; the warehouse management apparatus is configured to generate an operation instruction for the target goods.

In a fifth aspect, the present application discloses a computer-readable storage medium, the computer-readable storage medium storing computer-executable instructions therein, and a processor, when executing the computer-executable instructions, implementing the method for taking out and placing goods as provided in any mode of implementation corresponding to the first aspect of the present application.

In a sixth aspect, the present application discloses a computer program product, including program code, when a computer runs the computer program product, the program code executing the method for taking out and placing goods as provided in any mode of implementation corresponding to the first aspect of the present application.

In combination with the above technical solutions, according to the method and device for taking out and placing goods, the warehousing robot and the warehousing system provided by the present application, for the warehousing system based on the dynamic storage location storage mechanism, the method includes: moving, according to the operation instruction for the target goods, to the target position, where the target position is a position corresponding to the dynamic goods storage space for the target goods. acquiring first state information and second state information, and determining, according to the first state information and the second state information, available spacing between the target goods and adjacent objects, where the first state information is used for representing a spatial position feature of the target goods and the second state information is used for representing spatial position features of the adjacent objects; and taking out or storing the target goods according to the available spacing. The first state information and the second state information are acquired, and the available spacing between the target goods and the adjacent objects is determined according to the first state information and the second state information so as to determine whether the target goods can be stored in and taken out of the dynamic goods storage space. The safety for taking out or storing the target goods is improved.

BRIEF DESCRIPTION OF THE DRAWINGS

Accompanying drawings herein are incorporated into a specification and constitute a part of this specification, show embodiments that conform to the present disclosure, and are used for describing a principle of the present disclosure together with this specification.

FIG. 4 is a schematic diagram of storage of a rack in the embodiment as shown in FIG. 3 of the present disclosure;

FIG. 5 is a flowchart of a method for taking out and placing goods provided by another embodiment of the present disclosure;

FIG. 6 is a schematic diagram I showing the positional relationship between target goods and adjacent objects in the embodiment of FIG. 5 of the present disclosure;

FIG. 9 is a flowchart of a method for taking out and placing goods provided by another embodiment of the present disclosure;

FIG. 10 is a schematic diagram I showing the positional relationship between target goods and adjacent objects in the embodiment of FIG. 9 of the present disclosure;

FIG. 11 is a schematic diagram II showing the positional relationship between target goods and adjacent objects in the embodiment of FIG. 9 of the present disclosure;

Specific embodiments of the present disclosure have been shown by the above-described drawings and will be described in more details hereinafter. The accompanying drawings and literal descriptions are not intended to limit the scope of the idea of the present disclosure in any manner, but explain the concept of the present disclosure by referring to specific embodiments for a person skilled in the art.

DETAILED DESCRIPTION

Exemplary embodiments will be described in detail herein, examples of which are represented in the accompanying drawings. When the following description relates to the accompanying drawings, the same numerals in different accompanying drawings indicate the same or similar elements, unless otherwise indicated. The modes of implementation described in the following exemplary embodiments do not represent all modes of implementation that are consistent with the present disclosure. On the contrary, they are only examples of devices and methods that are consistent with some aspects of the present disclosure, as described in detail in the appended claims.

The technical solutions of the present disclosure and how the technical solutions of the present disclosure solve the technical problems described above are described in detail below in terms of specific embodiments. These specific embodiments below may be combined with each other and may not be repeated in some embodiments for the same or similar concepts or processes. Embodiments of the present disclosure will be described below in conjunction with the accompanying drawings.

The scenarios for the application of the embodiments of the present disclosure are explained below.

The present application is applied to the scenario of dynamically configuring the goods storage space, and the present application provides a method for placing goods in a dynamically configured goods storage space that is different from a stationary storage location.

Dynamically configuring the goods storage space means that after a system determines the goods to be stored, a first storage space adapted to the size of the goods is allocated from an existing unoccupied space according to the size of the goods, where the unoccupied space may be a space of any size and the unoccupied space does not include a stationary storage location that has been divided. The first storage space can accommodate the goods to be stored, the stationary storage location is a pre-defined storage location in a warehouse, and the stationary storage location is at a stationary position and of a defined size.

A dynamic goods storage space may be a space through which goods storage spaces are dynamically configured.

Exemplarily, a one-dimensional configuration mode and/or two-dimensional configuration mode are/is applied to dynamical configuration of the goods storage spaces at least.

Figure 1A:
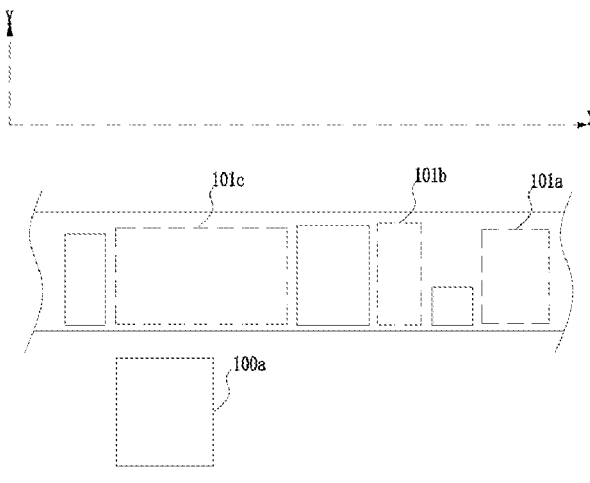
FIG. 1A is a schematic diagram of storage in a one-dimensional configuration mode provided by an embodiment of the present application.

Exemplarily, FIG. 1A is a schematic diagram of storage in a one-dimensional configuration mode provided by an embodiment of the present application; in conjunction with the X-Y coordinate system, the one-dimensional configuration mode means that goods in each layer of the goods storage space may be placed in only one row in the depth Y direction, where, in the one-dimensional mode, the goods storage space includes a first unoccupied space and/or a first occupied space, specifically, the first occupied space is a space in which the goods are already placed in the direction of entry and exit of the goods.

Figure 1B:
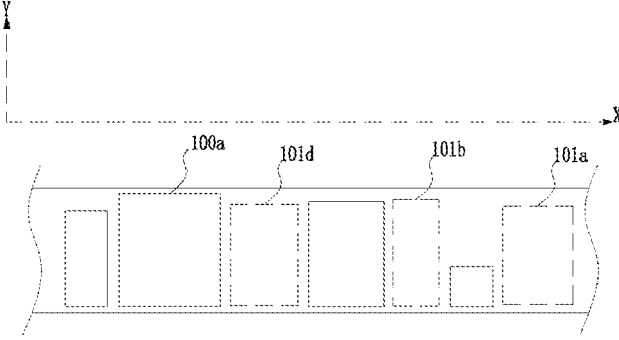
FIG. 1B is a schematic diagram of storage after goods are placed provided by the embodiment as shown in FIG. 1A of the present application.
Figure 1C:
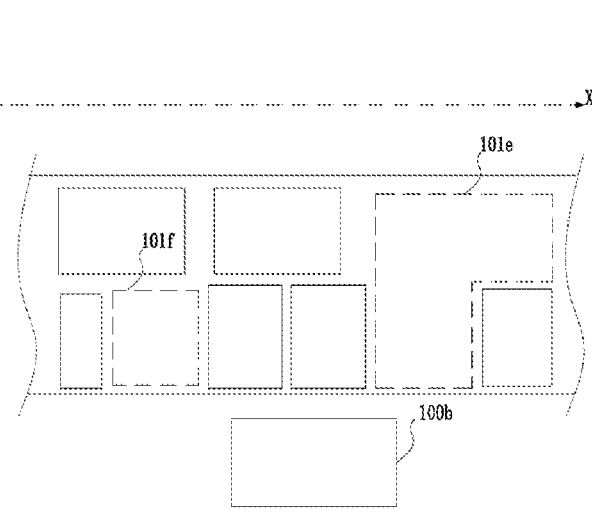
FIG. 1C is a schematic diagram of storage in a two-dimensional configuration mode provided by an embodiment of the present application.

Exemplarily, FIG. 1C is a schematic diagram of storage in a two-dimensional configuration mode provided by an embodiment of the present application; in conjunction with the X-Y coordinate system, the two-dimensional configuration mode means that goods in each layer of the goods storage space may be placed in one row, in multiple rows or in one row or multiple rows in the depth Y direction. That is, in the two-dimensional configuration mode, the goods in the goods storage space are allowed to be placed in multiple rows in the depth Y direction, where, in the two-dimensional mode, the goods storage space includes a second unoccupied space and/or a second occupied space, specifically, the second unoccupied space includes a space that is not occupied by the goods in the direction of entry and exit of the goods.

For example, FIG. 1A is a schematic diagram of storage in a one-dimensional configuration mode provided by an embodiment of the present application; in the one-dimensional configuration mode, as shown in FIG. 1A, the unoccupied space in the above dynamically configured goods storage space refers to spaces 101*a*, 101*b* and 101*c* as in FIG. 1A. After the system confirms the goods to be stored, then, goods 100*a* find out a first storage space, such as the space 101*c*, that is most suitable for the goods 100*a*, from the unoccupied spaces, i.e., the spaces 101*a*, 101*b* and 101*c*.

FIG. 1B is a schematic diagram of storage after goods are placed provided by the embodiment as shown in FIG. 1A of the present application; as shown in FIG. 1B, after the goods 100*a* are placed, the currently unoccupied spaces are spaces 101*a*, 101*b* and 101*d*, where the space 101*d* is the newly defined unoccupied space after the space 101*c* is partially occupied by the goods 100*a*.

FIG. 1C is a schematic diagram of storage in a two-dimensional configuration mode provided by an embodiment of the present application; as shown in FIG. 1C, by considering the two-dimensional configuration mode, the unoccupied space on a rack refers to a space 101e and a space 101f as in FIG. 1C. After the system confirms the goods to be stored, then, goods 100b find out a first storage space, such as the space 101e, that is most suitable for the goods 100b, from the unoccupied spaces, i.e., the space 101e and the space 101f.

Figures 1D, 1E:
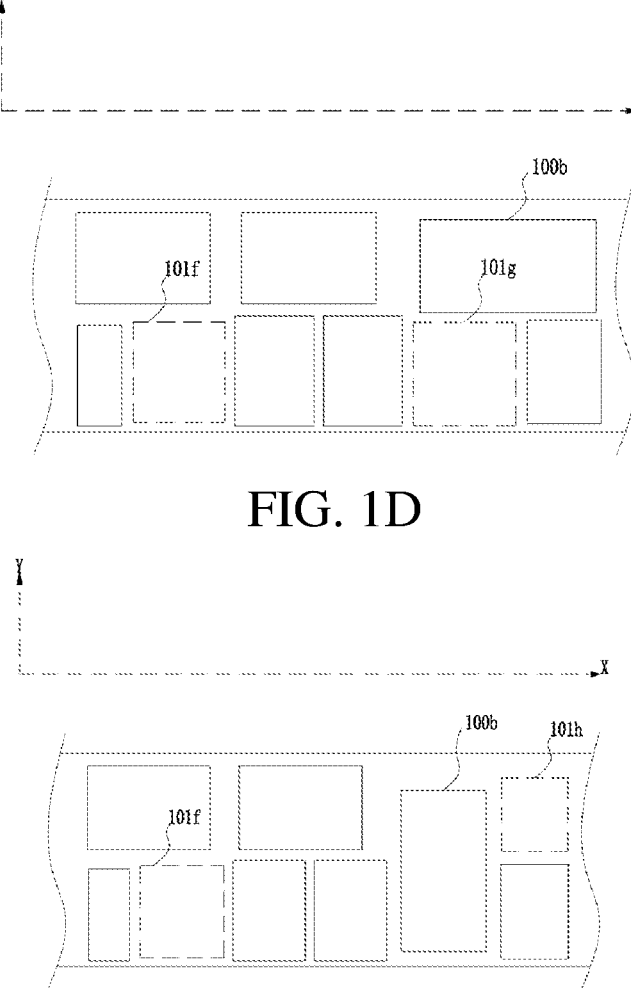
FIG. 1D is a schematic diagram of storage after goods are placed in the embodiment corresponding to FIG. 1C of the present application.
FIG. 1E is a schematic diagram of storage after goods are placed in the embodiment corresponding to FIG. 1C of the present application.

FIG. 1D is a schematic diagram of storage after goods are placed in the embodiment corresponding to FIG. 1C of the present application; as in FIG. 1D, after the goods 100b are placed, the currently unoccupied space refers to a space 101f and a space 101g. The space 101g is the newly defined unoccupied space after the space 101e is partially occupied by the goods 100b.

FIG. 1E is a schematic diagram of storage after goods are placed in the embodiment corresponding to FIG. 1C of the present application; with reference to FIGS. 1C, 1D and 1E, it can be seen that the goods 100b are placed with different orientations in FIGS. 1D and 1E, i.e., the goods 100b can be turned when placed, i.e., the orientation of the goods to be stored can be changed when the goods are placed, and after the goods 100b are placed, the currently unoccupied space refers to spaces 101f and 101h. The space 101h is the newly defined unoccupied space after the space 101e is partially occupied by the goods 100b.

Figure 1F:
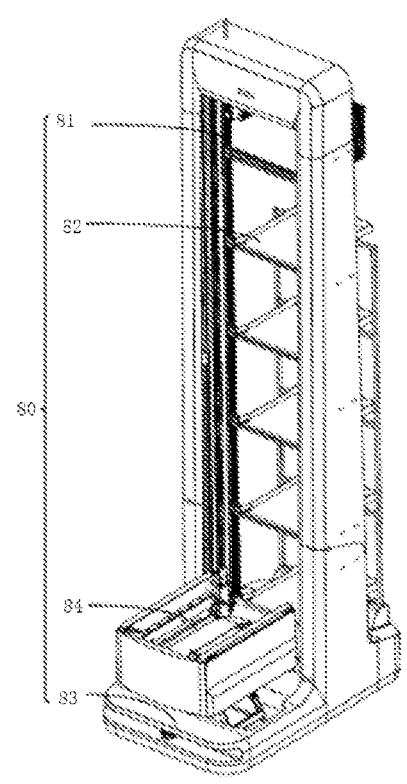
FIG. 1F is a schematic structural diagram of a robot provided by an embodiment of the present application.

Exemplarily, FIG. 1F is a schematic structural diagram of a robot provided by an embodiment of the present application. As shown in FIG. 1F, the transport robot 80 includes a mobile chassis 83, a storage rack 82, a carrying device 84, and a lifting\lowering assembly 81. The storage rack 82, the carrying device 84 and the lifting\lowering assembly 81 are all mounted on the mobile chassis 83, and a number of storage units are disposed on the storage rack 82. The lifting\lowering assembly 81 is configured to drive the carrying device 84 to move up and down so that the carrying device 84 is aligned with any storage unit on the storage rack 82, or aligned with a rack and/or goods. The carrying device 84 can be oriented by rotating on a vertical axis to be aligned with the storage unit, or aligned with the rack and/or the goods. The carrying device 84 is configured to perform loading or unloading of the goods to carry the goods between the rack and the storage unit.

Exemplarily, the storage rack 82 may be configured selectively or not configured, when the storage rack 82 is not configured, the goods are stored in the accommodating space of the carrying device 84 when the robot 80 carries the goods.

The robot 80 in the above embodiment can perform the method for storing goods shown in the present application for carrying the goods between the rack and a workstation.

When the robot 80 performs the task of storing the goods, the robot 80 moves to the position of a storage space to which the goods are assigned, and by means of the lifting\lowering assembly 81 in conjunction with the carrying device 84, the goods are carried from the storage unit of the storage rack 82 to the rack.

Figure 1G:
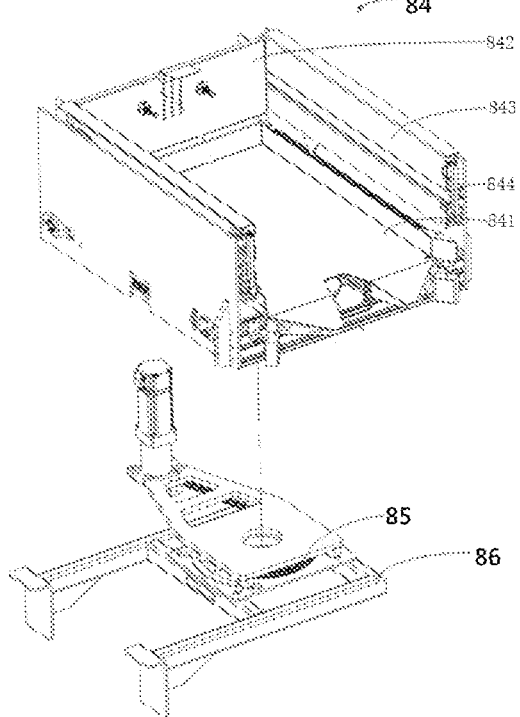
FIG. 1G is a schematic structural diagram of a carrying device in the embodiment as shown in FIG. 1F of the present application.

Exemplarily, FIG. 1G is a schematic structural diagram of a carrying device in the embodiment as shown in FIG. 1F of the present application.

Exemplarily, the carrying device 84 is mounted on a bracket 86 by means of a rotating mechanism 85, and the rotating mechanism 85 is configured to drive the carrying device 84 to rotate around a vertical axis with respect to the bracket 86 to be aligned with the storage unit, or aligned with the rack and/or the goods. The carrying device 84 is configured to carry the goods between the storage unit and the rack. If the carrying device 84 is not aligned with the rack and/or the goods, the carrying device 84 can be driven by the rotating mechanism 85 to rotate with respect to the bracket 86 to ensure that the carrying device 84 is aligned with the rack and/or the goods.

Figure 1H:
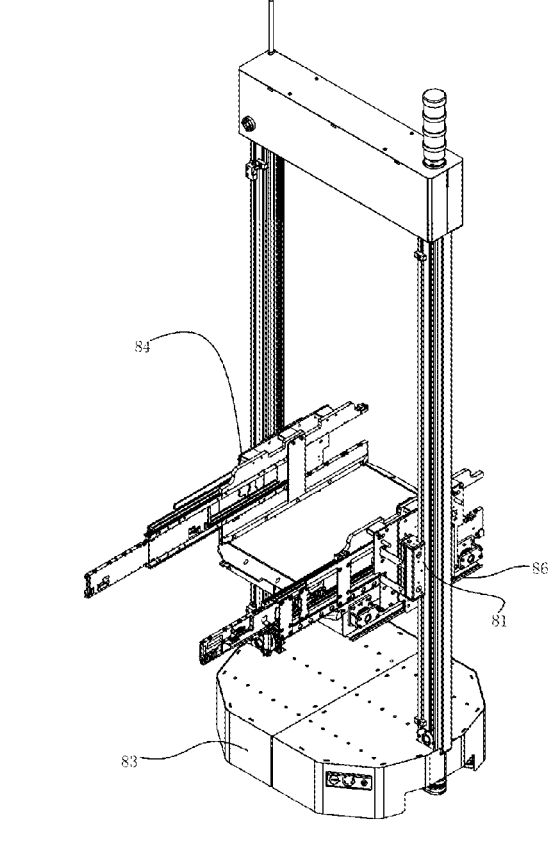
FIG. 1H is a structure of a robot and a carrying device thereof in an embodiment of the present application.

FIG. 1H is a structure of a robot and a carrying device thereof in an embodiment of the present application. In conjunction with FIGS. 1F and 1G, it can be understood that the rotating mechanism 85 can be omitted depending on the practical situation, e.g., it is sufficient that after the transport robot 80a moves in a stationary track and moves to a position in the vicinity of the rack, the carrying device 84 is always aligned with the rack and/or the goods, and the goods are configured in the goods taking direction of the carrying device 84.

Figure 1I:
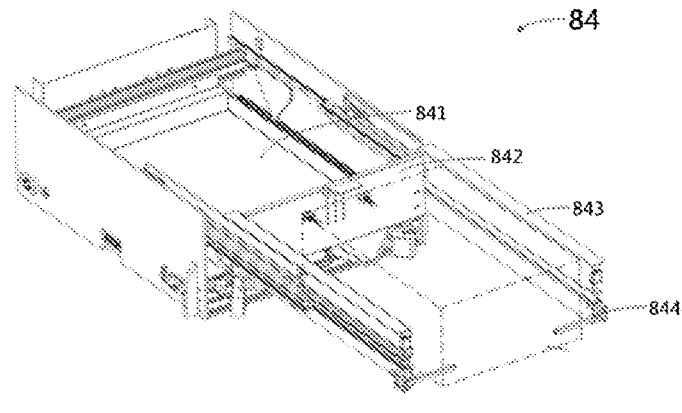
FIG. 1I is a schematic structural diagram of a carrying device in an embodiment of the present application.

Exemplarily, FIG. 1I is a schematic structural diagram of a carrying device in an embodiment of the present application, and understanding is easier in conjunction with FIG. 1G. As shown in FIG. 1I, the carrying device 84 includes a tray 841 and a telescopic arm assembly. The tray 841 is configured to hold the goods and may be a flat plate disposed horizontally. The telescopic arm assembly is configured to push the goods placed on the tray 841 out of the tray 841 or pull the goods to the tray 841. The telescopic arm assembly includes a telescopic arm 843, a fixed push rod 842 and a movable push rod 844. The telescopic arm 843 includes a left telescopic arm and a right telescopic arm, the telescopic arm 843 can be horizontally extended, in a direction perpendicular to the extension of the telescopic arm 843 and parallel to the tray 841, and the telescopic arm 843 is located on one side of the tray 841. The telescopic arm 843 is powered by an electric motor and the power is transmitted by a chain wheel mechanism, and the chain wheel mechanism can be replaced by a transmission mechanism such as a belt pulley mechanism and a lead screw mechanism, depending on the actual situation. The fixed push rod 842 and the movable push rod 844 are both mounted on the telescopic arm 843 and the fixed push rod 842 and movable push rod 844 can be extended together with the telescopic arm 843. The fixed push rod 842 and the tray 841 are located on the same side of the telescopic arm 843, and the fixed push rod 842 is configured to push the goods out of the tray 841 when the telescopic arm 843 is extended. The movable push rod 844 can be retracted into the telescopic arm 843 and when the movable push rod 844 is not retracted into the telescopic arm 843, the movable push rod 844, the fixed push rod 842 and the tray 841 are all located on the same side of the telescopic arm 843 and the movable push rod 844 is located in the direction of the extension of the fixed push rod 842 along the telescopic arm 843. The movable push rod 844 can be driven directly by an electric motor, or, depending on the actual situation, the power can be transmitted by a transmission mechanism such as a gear set or a linkage mechanism. The movable push rod 844 is configured to pull the goods to the tray 841 when the movable push rod 844 is not retracted into the telescopic arm and the telescopic arm 843 is retracted.

Exemplarily, the fixed push rod 842 of the carrying device 84 may be designed as a finger pole structure as the movable push rod 844.

Exemplarily, the carrying device 84 may be designed in such a way that the spacing width of the telescopic arm assembly is adjustable. The spacing width of the telescopic arm assembly can be adjusted according to the size of the goods when the goods are stored and taken.

Figure 1J:
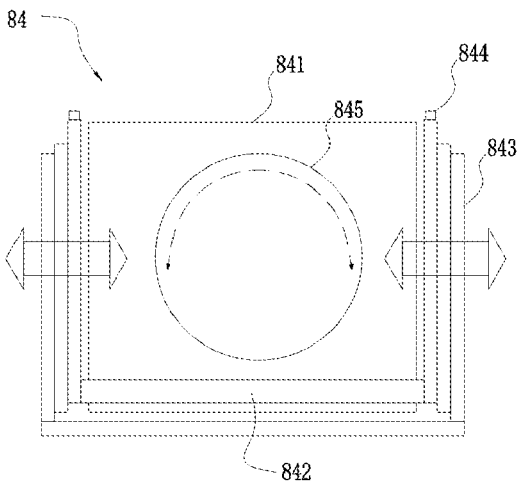
FIG. 1J is a schematic structural diagram of another carrying device in the embodiment as shown in FIG. 1I of the present application.

Exemplarily, the carrying device 84 may further include a steering structure, such as a rotating disk, and the steering structure may be configured to change the orientation of the goods placed on the tray 841 thereof. FIG. 1J is a schematic structural diagram of another carrying device in the embodiment as shown in FIG. 1I of the present application; in conjunction with FIG. 1J and FIG. 1I, it can be seen that the carrying device 84 can also include a steering structure, i.e., a rotating disk 845 in FIG. 1I, for changing the orientation of the goods placed on the tray 841 thereof.

Figure 1K:
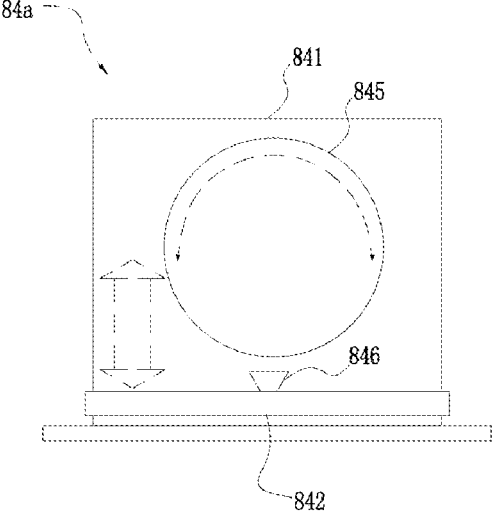
FIG. 1K is a schematic structural diagram of another carrying device in an embodiment of the present application.

Exemplarily, FIG. 1K is a schematic structural diagram of another carrying device in an embodiment of the present application; a carrying device 84*a* includes one or more suction cups 846 which are configured on the fixed push rod 842, and the fixed push rod 842 may be in the shape of a rod or a plate. The fixed push rod 842 can be driven to displace back and forth in the direction facing the goods and/or the rack when the goods are stored/taken. The goods are sucked by means of the suction cup 846, and then the goods are carried to the rack or the goods are carried to the tray 841 in conjunction with the displacement of the fixed push rod 842.

Figure 1L:
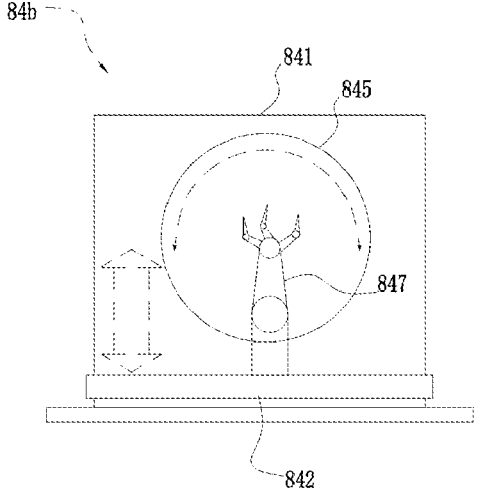
FIG. 1L is a structure of another carrying device in an embodiment of the present application.

Exemplarily, FIG. 1L is a structure of another carrying device in an embodiment of the present application; a carrying device 84*b* includes one or more robotic arms 847 which are configured at appropriate positions on the fixed push rod 842 and/or the carrying device 84*b*. The fixed push rod 842 can be driven to displace back and forth in the direction facing the goods and/or the rack when the goods are stored/taken. The goods are grabbed/hooked by the robotic arm 847, and then the goods are carried to the rack or the goods are carried to the tray 841 in conjunction with the displacement of the fixed push rod 842.

Exemplarily, the carrying device (84*a*, 84*b*) may also include a steering structure, such as the rotating disk 845 in FIGS. 1J and 1K, to change the orientation of the goods placed on the tray 841 thereof.

The structure of the carrying device of the embodiment shown in the present application may include one or a combination of more in the above examples.

The beneficial effect is that the use of the structures such as the suction cup and the robotic arm, as opposed to the telescopic arm, reduces the safe spacing between the goods and thus improves the overall warehousing density.

Figure 2:
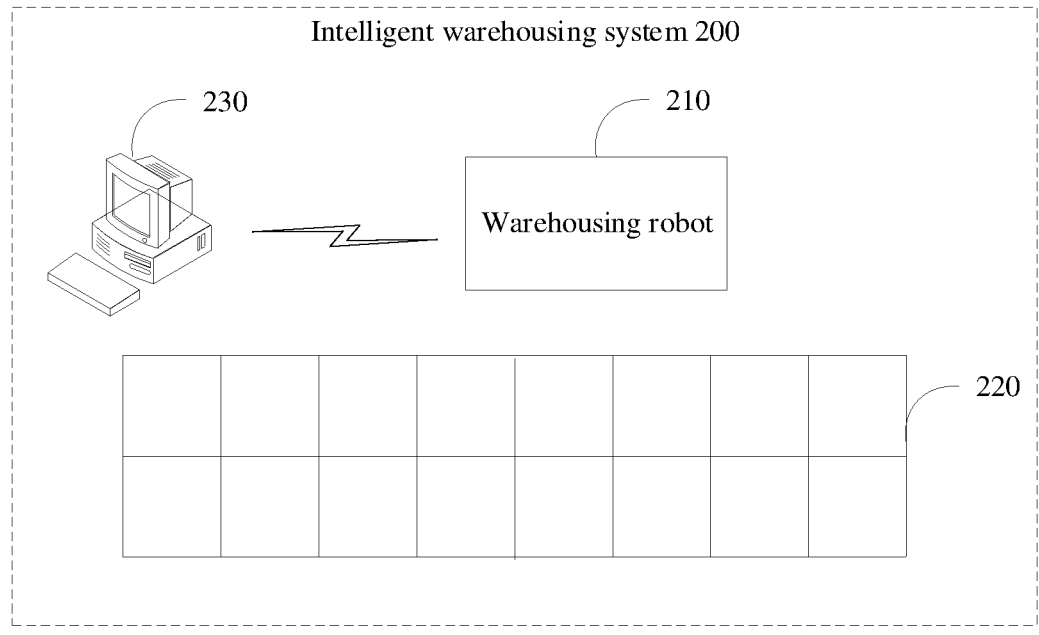
FIG. 2 is a diagram of an application scenario of a method for taking out and placing goods provided by an embodiment of the present disclosure.

FIG. 2 is a diagram of an application scenario of a method for taking out and placing goods provided by an embodiment of the present disclosure; as shown in FIG. 2, the method for taking out and placing goods provided by the embodiment of the present disclosure may be performed by a warehousing robot of an intelligent warehousing system. An intelligent warehousing system 200 uses a warehousing robot 210 to take out and/or store the target goods on a rack 220, and uses a warehouse management apparatus 230 to perform path planning, state monitoring, scheduling, etc. on the warehousing robot 210 so as to enable the warehousing robot 210 to move to a set position for taking out or storing the target goods; and the warehouse management apparatus 230 also stores storage information of each storage location of the rack 220 and basic information of target warehouse-out goods so as to facilitate warehouse management. When the warehousing robot 210 receives an instruction for taking out or storing the target goods, first, the warehousing robot moves to a corresponding position according to the instruction, and then takes out or store the target goods directly.

However, due to measurement errors or human operation errors, the goods on the rack 220, such as the adjacent object of the target goods, may be placed at a position deviating from the preset position, so that the spacing between the target goods and the adjacent object thereof or the stand columns is too small, for example, smaller than the width of a carrying device of the warehousing robot 210, and if the warehousing robot 210 directly takes out or stores the target goods in this case, damage to the target goods, the adjacent object and even the rack may be caused, resulting in economic losses.

In order to improve the safety for taking out and storing goods, an embodiment of the present disclosure provide a method for taking out and storing goods, the method determines available goods spacing between the target goods and each adjacent object in real time according to the state information of the adjacent object corresponding to the target goods, such as the adjacent object or the rack stand column, and the state information of the target goods before the target goods are taken out or stored, and further can judge whether to take out or store the target goods according to each available goods spacing, effectively ensuring that sufficient operation spacing is provided for taking out or storing the target goods, and improving the safety of taking out or storing goods.

Figure 3:
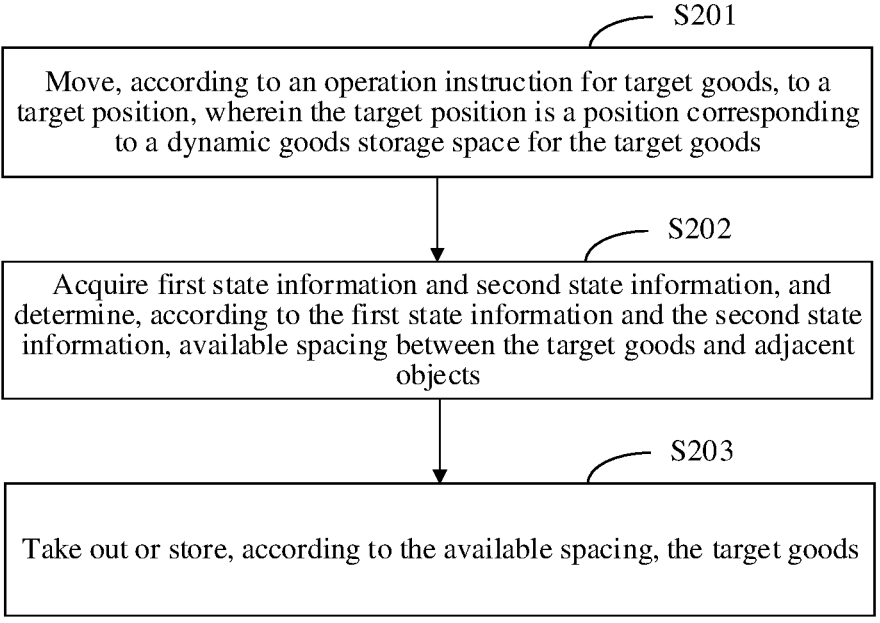
FIG. 3 is a flowchart of the method for taking out and placing goods provided by an embodiment of the present disclosure.

FIG. 3 is a flowchart of a method for taking out and placing goods provided by an embodiment of the present disclosure; as shown in FIG. 3, the method for taking out and placing goods may be performed by a warehousing robot of a warehousing system. The method for taking out and placing goods provided by this embodiment includes the following steps:

Step S201: Move, according to an operation instruction for target goods, to a target position, where the target position is a position corresponding to a dynamic goods storage space for the target goods.

As described before, after a system determines the target goods to be stored, a first storage space adapted to the size of the target goods is allocated from an existing unoccupied space according to the size of the target goods, where the unoccupied space may be a space of any size and the unoccupied space does not include a stationary storage location that has been divided. The first storage space can accommodate the target goods, the stationary storage location is a pre-defined storage location in a warehouse, and the stationary storage location is at a stationary position and of a defined size. The dynamic goods storage space may be a space obtained by dynamically configuring the goods storage space.

The target goods are goods that need to be operated by the warehousing robot, for example, the goods that need to be taken out or stored. The target goods may be goods provided by a user, but may also be goods, parcels, containers, etc. of a warehousing system loaded with the user's goods. The operation instruction may be issued by the warehouse management apparatus of the warehousing system, and may also be an operation instruction input by relevant personnel into the warehousing robot.

Specifically, the target position may be a position at a set distance directly in front of the first storage space allocated to the target goods for placement, may also be a position on the left front of the first storage space, or may also be a position on the right front of the first storage space, and the specific position thereof may be determined by the warehousing system, or may be determined according to the operation of the warehousing robot for taking out and placing goods.

Specifically, a rack corresponding to the first storage space of the target goods is a rack based on a mechanism for dynamically configuring the goods storage space, namely, the storage location of each goods on the rack is determined according to the size of the goods, and the storage locations may be different in size. That is to say, when the sizes of goods stored in the rack are different, the sizes of the corresponding storage locations thereof are also different. Various storage locations of the rack of a traditional warehousing system are predetermined storage locations of the same size, so that when the storage location of the goods is determined, the storage space corresponding to each storage location on the rack is regarded as a discrete and non-continuous space. For the rack based on the mechanism for dynamically configuring the goods storage space, when the first storage space allocated to the target goods is determined, each free storage space on the rack is regarded as an unoccupied space, and then it is determined to allocate a first storage space adapted to the target goods according to the size information of the target goods and the spatial size of each unoccupied space.

Further, the preset length of the first storage space adapted to the target goods may be the sum of the length of the target goods and the preset safe length, where the preset length is the length of the first storage space pre-planned by the warehouse management apparatus of the warehousing system, and is a theoretical value. The preset width of the first storage space adapted to the target goods may also be the sum of the width of the target goods and the preset width. Each layer of goods on the rack corresponding to the target goods may be placed in one row, in multiple rows or in one row and multiple rows.

Exemplarily, FIG. 4 is a schematic diagram of storage of a rack in the embodiment as shown in FIG. 3 of the present disclosure; as shown in FIG. 4, goods 311 to goods 322 are stored in a rack 310 of a warehousing system, and specific positions are as shown in FIG. 4. It can be seen from FIG. 4 that the sizes of storage locations corresponding to different sizes of goods, such as the goods 311, the goods 314 and the goods 318, on the rack 310 are also different, and each of the goods on the rack 310 can be placed in multiple rows according to the size information thereof; in FIG. 4, taking the placement in three rows and two rows as an example, the goods 311, the goods 312 and the goods 313 are placed in three rows, while the goods 319 and the goods 320 are placed in two rows. For the goods 311, the adjacent objects thereof include a rack stand column on the left side thereof, i.e., the left stand column of the rack 310, and further include adjacent objects, i.e., the goods 312 and the goods 314. For the goods 317, the adjacent objects thereof are both adjacent objects, specifically the goods 314, the goods 316, the goods 318, and the goods 319.

Specifically, the operation instruction may include position information of the first storage space of the target goods, the position information may be three-dimensional storage location coordinates of the first storage space, and may also be the position of the first storage space relative to the stand column of the rack corresponding thereto, and the position information may also include the height and two-dimensional coordinates of the first storage space; however, other forms may also be used for description, which is not defined by the present application herein.

Specifically, the warehouse management apparatus generates the operation instruction of the target goods according to the requirements, such as a warehouse-out requirement, a warehouse-in requirement and a sorting requirement, and sends the operation instruction to the warehousing robot, and the warehousing robot moves to a target position corresponding to the first storage space according to the position information of the first storage space in the operation instruction.

Further, after the warehousing robot moves to the target position according to the operation instruction, according to the height of the first storage space, the carrying device is adjusted so that the carrying device and the first storage space are located at the same horizontal plane. After the height of the carrying device is adjusted, the carrying device may also be rotated to adjust the carrying device to a state where the carrying device is opposite to the first storage space for subsequently taking out or storing the target goods.

Step S202: Acquire first state information and second state information, and determine, according to the first state information and the second state information, available spacing between the target goods and the adjacent objects.

The first state information is used for representing the spatial position feature of the target goods and the second state information is used for representing the spatial position feature of the adjacent object.

Exemplarily, the spatial position feature is information that represents the morphology and position of an object in a space. For example, the size of the object, the position of the space where the object is located, etc. are included. The first state information and the second state information respectively represent information of the morphology and the position of the target goods and the adjacent objects adjacent thereto in the space, and according to the first state information and the second state information, a spatial relationship between the target goods and the adjacent object adjacent thereto, such as, a position relationship, a distance relationship, a direction relationship, etc. between the target goods and the adjacent objects adjacent thereto, can be determined. Thus, according to the first state information and the second state information, available spacing between the target goods and the adjacent objects adjacent thereto can be determined. The available spacing is the spatial size at the dynamic goods storage space when the goods are placed or taken out. Exemplarily, the larger the available spacing is, the longer the distance between the target goods and the adjacent object adjacent thereto is, and the more easily the target goods can be safely taken out or placed by means of the carrying device. Conversely, the smaller the available spacing, the shorter the distance between the target goods and the adjacent object adjacent thereto is, and the less easily the target goods can be safely taken out or placed by means of the carrying device.

Exemplarily, the carrying device may be one or more of a telescoping arm assembly, a suction cup, and a robotic arm. For example, if the carrying device is a robotic arm, the greater the available spacing, the easier it is for the robotic arm to safely extend into the dynamic goods storage space corresponding to the available spacing for the retrieving and storing operation. For another example, the carrying device is a suction cup, and the suction cup moves the target goods by being sucked on the front side of the target goods to store or take out the target goods, and the larger the available spacing is, the easier it is for the suction cup to suck the target goods and perform the operation of storing and taking out the goods, and conversely, the more difficult it is for the suction cup to perform the operation.

Further, the adjacent objects include at least one adjacent object and rack stand column, or at least two adjacent objects. The spatial position feature of the adjacent object may be position information of a preset key point of the adjacent object, and the spatial position feature of the target goods may be position information of a preset key point of the target goods.

Exemplarily, for the adjacent object, the preset key point may be a center point of the adjacent object. Exemplarily, the shape of the adjacent object is a square structure such as a cube or a rectangle, and one or more of eight vertices or central points of the adjacent object may be used as the preset key point, or a central point of a plane located on the same horizontal plane as the central point of the target goods may be used as the preset key point. For the rack stand column, the preset key point may be a point on the outer surface of the rack stand column that is located at the same horizontal plane as the center of the target goods. Of course, points at other positions may also be selected as preset key points, and the present disclosure is not limited thereto. The second state information is data representing the position information of the preset key point. Similarly, for the target goods, the preset key point may be a center point of the target goods, or a vertex or center point of each plane, which will not be repeated herein.

Therefore, according to the key point corresponding to the first state information and the key point corresponding to the second state information, a specific available space between the target goods and the adjacent object can be determined.

Optionally, collecting sensing information at the target position by means of a sensor disposed on the warehousing robot; and perform feature recognition on the sensing information to acquire the first state information and the second state information.

Specifically, the detection result of each adjacent object can be collected by the sensor disposed on the warehousing robot, and then the position information of each adjacent object can be determined according to the detection result of each adjacent object, and then the second state information can be determined. Further, when the target goods placed at the dynamic goods storage space are taken out, the first state information of the target goods can be obtained in the same manner as described above, and at the same time, when the target goods are placed, the first state information can also be obtained in a mode of pre-obtaining information relevant to the target goods, which will not be described in detail herein.

The sensor may be one or more of a 2D camera, a 3D camera, a laser radar, an infrared sensor, an ultrasonic sensor, etc. The sensor may be disposed on the main body of the warehousing robot or on the carrying device of the warehousing robot, such as disposed on the left arm and/or the right arm of the carrying device.

Further, when the sensor is the 2D camera, a detection image of the target goods and each adjacent object can be collected based on the 2D camera, and then based on an image recognition algorithm, the first state information of the target goods and the second state information of each adjacent object are determined according to the detection image. When the sensor is the 3D camera, point cloud data of each adjacent object can be collected based on the 3D camera, and then the first state information of the target goods and the second state information of each adjacent object are determined according to the point cloud data of each adjacent object. When the sensor is the laser radar or ultrasonic sensor, detection signals of the target goods and each adjacent object can be collected based on the laser radar or ultrasonic sensor and the infrared sensor, and then the position information of each adjacent object can be determined according to the amplitude of the detection signal of each adjacent object.

Step S203: Take out or store, according to the available spacing, the target goods.

After determining the available spacing, in a possible mode of implementation, when the carrying device is, for example, a robotic arm, it may be determined whether the robotic arm can be extended into the available space for operation to take out or place the target goods. Specifically, if the available spacing is greater than or equal to a storage spacing threshold, it indicates that the robotic arm can be safely extended into the available space, and then the robotic arm is controlled to place the target goods in the dynamic goods storage space; if the available spacing is less than a storage spacing threshold, it indicates that the robotic arm cannot be safely extended into the available space, then information that the target goods cannot be placed or taken out is reported to a server, so as to notify the user to perform manual intervention.

In another possible mode of implementation, the carrying device is, for example, a suction cup, the suction cup moves the target goods by being sucked to the front side of the target goods, so that the suction cup can be extended into the robotic arm to clamp the target goods without large available spacing, while only ensuring that the available spacing is sufficient for the target goods to be placed in without colliding with adjacent objects or generating excessive friction. In the scenario where the carrying device is a suction cup, if it is judged that the available spacing is less than a storage spacing threshold, it indicates that the target goods cannot be placed in the corresponding dynamic goods storage space, and similarly, the user may be notified in a way of reporting information, which will not be repeated herein.

Optionally, when controlling the carrying device to place the target goods in the dynamic goods storage space, controlling the carrying device to place the target goods at a reference position in the dynamic goods storage space, where the reference position is used for indicating the position of the target goods in the dynamic goods storage space so that the distance from the target goods to the adjacent object is less than or equal to a preset distance threshold. For example, the target goods are placed at a position 10 cm away from the left stand column thereof, and the 10 cm distance is greater than a preset storage spacing threshold, i.e., when the target goods are taken out, the carrying device can safely operate the target goods to be stored or taken out, so that the carrying device or the target goods do not collide with or contact the adjacent object, and at the same time, the target goods can be close to the left stand column, so as to save the space position of the dynamic goods storage space, and improve the storage amount and circulating efficiency of goods in the dynamic goods storage space.

According to the method and device for taking out and placing goods, the warehousing robot and the warehousing system provided by the embodiment of the present application, for the warehousing system based on the dynamic storage location storage mechanism, moving, according to the operation instruction for the target goods, to the target position, where the target position is a position corresponding to the dynamic goods storage space for the target goods; acquiring first state information and second state information, and determining, according to the first state information and the second state information, available spacing between the target goods and adjacent objects, where the first state information is used for representing a spatial position feature of the target goods and the second state information is used for representing spatial position features of the adjacent objects; and The target goods are taken out or stored according to the available spacing, and since the spatial position feature of the target goods and the adjacent object of the target goods are detected in real time and the available spacing is determined, the available spacing can be judged before the goods are stored or taken out, and the goods are stored only after the available spacing is greater than spacing of a preset security standard, the safety of the target goods in the storing and retrieving process is improved, and the overall operation efficiency of the warehousing system is improved.

FIG. 5 is a flowchart of a method for taking out and placing goods provided by another embodiment of the present disclosure; the method for taking out and placing goods provided by this embodiment is directed to the process of storing the target goods, a corresponding operation instruction is a storing instruction, and the available storage spacing is used for representing the spatial size available for storing the target goods at the dynamic goods storage space. The first state information includes boundary size information of the target goods and the second state information includes position information of the adjacent object. On the basis of the embodiment shown in FIG. 3, in this embodiment, step S202 is further refined. As shown in FIG. 5, the method for taking out and placing goods provided in this embodiment includes the following steps:

Step S401: Move, according to an instruction for taking out the target goods, to a target position.

Step S402: Determine, according to the position information of the adjacent object, spatial distance information, where the spatial distance information is used for representing the spatial distance between the adjacent objects on both sides of the target goods.

Exemplarily, the position information of the adjacent object can be determined by collecting information of the target goods and the adjacent object by means of a sensor unit disposed on the warehousing robot, more specifically, for example, the position coordinates of the adjacent objects can be determined. The position coordinates can be obtained by acquiring two-dimensional or three-dimensional image information of the adjacent object and performing image recognition. Or determining the position of the adjacent object by means of a laser ranging sensor, an infrared distance sensor, etc. to obtain the size information and position determination information of the adjacent object to obtain the position coordinate, specifically, determining, according to the position information of the adjacent object and the size information of the adjacent object, contour position information of the adjacent objects on both sides of the target goods; and determine, according to the contour position information of the adjacent objects on both sides of the target goods, the spatial distance information. The specific mode of implementing the process is not repeated here.

Further, FIG. 6 is a schematic diagram I showing the positional relationship between target goods and adjacent objects in the embodiment of FIG. 5 of the present disclosure; as shown in FIG. 6, in a possible mode of implementation, the adjacent objects are at an ideal pose, namely, the placement space formed between the adjacent objects is a standard rectangular space; in an ideal pose state of the adjacent objects, the bottom surface of each piece of goods is parallel to the containing plane of the rack, and the side surface of each piece of goods is parallel to the side surface of the stand column of the rack; and with reference to FIG. 6, an adjacent object A and an adjacent object B are parallel to each other, and the distance in the length (or width) direction between the adjacent object A and the adjacent object B is the spatial distance corresponding to the spatial distance information. After the position information of each adjacent object is determined, the spatial distance can be determined by sensing information by performing calculation according to the corresponding position coordinate, and this process will not be described in detail here.

Figures 7, 8:
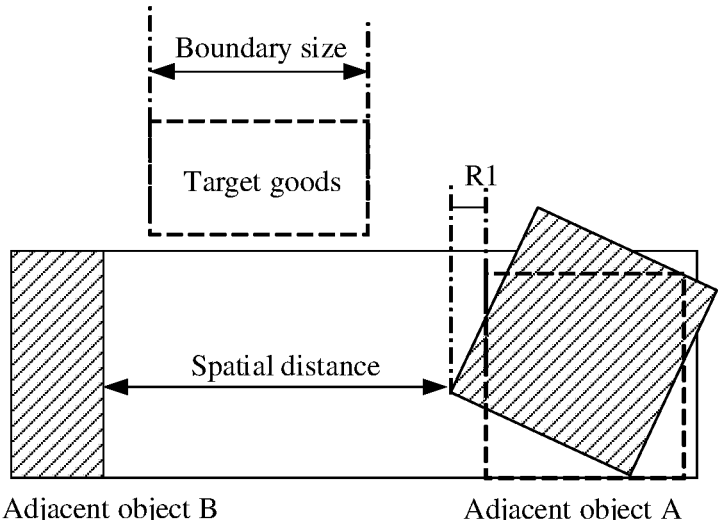
FIG. 7 is a schematic diagram II showing the positional relationship between target goods and adjacent objects in the embodiment of FIG. 5 of the present disclosure.
FIG. 8 is a schematic diagram III showing the positional relationship between target goods and adjacent objects in the embodiment of FIG. 5 of the present disclosure.

FIG. 7 is a schematic diagram II showing the positional relationship between target goods and adjacent objects in the embodiment of FIG. 5 of the present disclosure; as shown in FIG. 7, in another possible mode of implementation, the adjacent object is at a non-ideal pose, i.e., since the adjacent object is not normally placed and is inclined, the placement space formed between the adjacent object A and the adjacent object B is not a standard rectangular space, and at this time, information collected from the sensing information cannot accurately represent the size of the placement space formed between adjacent goods, and therefore the spatial distance information needs to be corrected.

Specifically, the second state information further includes pose information of the adjacent object, the pose information being used for representing the placement posture of the object. The determining, according to the position information of the adjacent object, spatial distance information, includes:

step S402A, determining, according to the pose information of the adjacent object, a first spatial correction amount, the first spatial correction amount being used for representing the amount of change in distance between the adjacent objects on both sides of the target goods caused by a change in the placement posture of the adjacent object. As shown in FIG. 7, the first spatial correction amount R1 is used for representing the change in the spatial distance information caused by the inclined placement of the adjacent object A, and more specifically, that is, consequently, the distance between the adjacent object A and the adjacent object B is reduced. FIG. 8 is a schematic diagram III showing the positional relationship between target goods and adjacent objects in the embodiment of FIG. 5 of the present disclosure; as shown in FIG. 8, in another possible mode of implementation, when the adjacent object B is also in the case of inclined placement, then the first spatial correction amount includes R1_1 and R1_2 for representing the change of the spatial distance information caused together by the inclined placement of the adjacent object A and the adjacent object B, i.e., the sum of the distance reduction amount R1 caused by the adjacent object A and the distance reduction amount R1_2 caused by the adjacent object B.

Exemplarily, a mode of implementation for determining the first spatial correction amount includes: acquiring preset reference pose information, the reference pose information being used for representing a standard placement posture of the adjacent object; and determine, according to an amount of change of the reference pose information and the pose information of the adjacent objects, the first spatial correction amount.

Exemplarily, the adjacent object may be goods or a stand column adjacent to the target goods.

Step S402B, determining, according to the position information of the adjacent object and the first spatial correction amount, the spatial distance information.

After determining the first spatial correction amount caused by the pose of the adjacent object, the spatial distance information is determined according to the position information of the adjacent object and the first spatial correction amount, where the spatial distance information takes into account the reduction of the spatial distance for storing the target goods in the dynamic goods storage space caused by the change of the pose of the adjacent object, thereby correcting the spatial distance information and improving the accuracy of the spatial distance information.

Step S403: Determine, according to the spatial distance information and the boundary size information, the available storage spacing.

In a possible mode of implementation, the boundary size information is data representing the boundary dimension of the target goods previously known by the warehousing robot, for example, the placement width of the target goods is the width of the space occupied by the target goods when being placed into the dynamic goods storage space. In another possible mode of implementation, the boundary size information may be information representing the placement width of the target goods, which is obtained by performing measurement in real time when the warehousing robot places the target goods, and is not specifically limited herein.

Further, by comparing a difference value between the spatial distance and the boundary dimension corresponding to the spatial distance information obtained in the above-mentioned step, the available storage spacing can be obtained, and the available storage spacing is used to ensure that the target goods can still be safely placed in the dynamic goods storage space after being clamped or absorbed by the carrying device, without touching the adjacent objects, so as to ensure the safety of the target goods in storage process.

Further, Optionally, determining the available storage spacing, further includes:

acquiring environmental error information, the environmental error information being used for representing the effect of the environment in which the warehousing robot is located on the available storage spacing; and
correcting, according to the environmental error information, the available storage spacing.

Specifically, the environmental error information includes rack tilt, mechanical errors of the robot itself, ground unevenness, box surface unevenness, sensor errors, algorithm calculation errors and other information. The environmental error information is obtained after performing measurement or test in advance, and pre-stored in the warehousing robot, or pre-stored in a server, and the warehousing robot acquires same through the server. According to the pre-acquired environmental error information, the available storage spacing is corrected, further improving the accuracy of the available storage spacing, and improving control safety in the goods storage process.

Step S404: Store, according to the available storage spacing, the target goods.

Specifically, according to the available storage spacing obtained in the above-mentioned step, a specific spatial size for storing the target goods in the dynamic goods storage space can be determined, and when the available storage spacing is greater than or equal to a preset value, it is determined that the target goods can still be safely placed in the dynamic goods storage space after being clamped or adsorbed by the carrying device without touching the adjacent object; conversely, when the available storage spacing is less than a preset value, it is determined that the target goods cannot be placed into the dynamic goods storage space after being clamped or adsorbed by the carrying device. Exemplarily, when the carrying device is a robotic arm, the preset value may be the boundary dimension of the robotic arm, such as the width of the robotic arm. Further, the robotic arm may include a left arm and a right arm, and the size information of the left arm and the size information of the right arm may be the same or different. when the size information of the left arm and the size information of the right arm are the same, the size information of the robotic arm may be the width of the left arm or the right arm, and the width may also be referred to as the thickness, and when the size information of the left arm and the size information of the right arm are different, the size information of the robotic arm is the width of the left arm and the width of the right arm. When the carrying device is a suction cup, the preset value is a distance value at which the target goods do not contact or collide with other goods when the suction cup sucks the target goods.

In this embodiment, according to the goods storage scenario, the size information of the target goods and the position information and pose information of the adjacent objects are detected through the warehousing robot, the available storage spacing between the adjacent objects is determined in real time, and then on the basis of the available storage spacing, whether the requirement of storage adjustment is met is judged, if the requirement of storage adjustment is met, the target goods are stored, and if the requirement of storage adjustment is not met, other control operation is performed; the target goods are stored in other ways, so as to improve the safety of taking out the target goods and avoid the loss caused when the goods are stored under too small spacing.

FIG. 9 is a flowchart of a method for taking out and placing goods provided by another embodiment of the present disclosure; the method for taking out and placing goods provided by this embodiment is directed to the process of taking out the target goods, a corresponding operation instruction is an instruction for taking out the goods, the available spacing includes available take-out spacing, and the available take-out spacing is used for representing the spatial size available for the carrying device to take out the target goods at the dynamic goods storage space. The first state information includes position information of the target goods and the second state information includes position information of the adjacent objects. On the basis of the embodiment as shown in FIG. 3, in this embodiment, step S202 is further refined, and a step of controlling the warehousing robot is added after step S203. As shown in FIG. 9, the method for taking out and placing goods provided by this embodiment includes the following steps:

Step S601: Move, according to the instruction for taking out the target goods, to a target position.

Step S602: Determine, according to the position information of the target goods, contour position information of the target goods.

Exemplarily, in a scenario where the target goods are taken, the target goods are already stored in the dynamic goods storage space, and both sides of the target goods are disposed on the adjacent objects, where the adjacent objects may be rack stand columns, or goods. According to the position information of the target goods, information of the target goods and the adjacent object can be collected according to the sensor unit disposed on the warehousing robot so as to determine the position information of the target object, the contour position information of the target goods is determined according to the position information, and more specifically, the position information of the target object refers to, for example, position coordinates of the target object, including position coordinates of key points on the contour of the target object, such as 8 vertex coordinates of a cube. By calculating the position coordinate, the position coordinate representing the contour position of the target object corresponding to the contour position information can be obtained. The position information of the target object can be obtained by collecting two-dimensional or three-dimensional image information of the adjacent object and performing image recognition. Or determining the position of the adjacent object by means of a laser ranging sensor, an infrared distance sensor, etc. to obtain the size information and position determination information of the target object so that the contour position information is acquired, and the specific mode of implementation of the process will not be repeated here.

Step S603, determining, according to the contour position information of the target goods and the position information of the adjacent object, the available take-out spacing between the target goods and the adjacent object.

Exemplarily, in a scenario where the target goods are taken, the available take-out spacing between the target goods and the adjacent object is the spatial size available for the carrying device to take out the target goods at the dynamic goods storage space, and when the target goods are too close to the adjacent objects on both sides, i.e., the available take-out spacing is too small, the carrying device cannot be controlled to normally take out the target goods. Thus, the available take-out spacing is determined by the positional relationship of the target goods with the adjacent object. Specifically, according to the position coordinate of the target goods corresponding to the contour position information of the target goods and the position coordinate corresponding to the position information of the adjacent object, the distance between the target goods and the adjacent objects on both sides can be determined, and the distance is the available take-out spacing. FIG. 10 is a schematic diagram I showing the positional relationship between target goods and adjacent objects in the embodiment of FIG. 9 of the present disclosure; as shown in FIG. 10, the available spacing includes a first available take-out spacing between the target goods and the adjacent object A and a second available take-out spacing between the target goods and the adjacent object B. According to the position information of the target goods and the position information of the adjacent object A and the adjacent object B, the first available take-out spacing and the second available take-out spacing are respectively determined, thereby determining the available take-out spacing.

Specifically, as shown in FIG. 10, both the target goods and the adjacent object are at the ideal pose, and the ideal pose has been described in the above-described embodiment, and will not be repeated herein. At this time, according to the contour position information of the target goods and the position information of the adjacent object, it is possible to directly determine the distance between the contour of the target goods and the adjacent object, that is, the available take-out spacing. However, in some another possible modes of implementation, the adjacent object or the target goods are at a non-ideal pose, i.e., since the adjacent object or the target goods are not normally placed and are inclined, at this time, information collected from the sensing information cannot accurately represent the available take-out spacing between the adjacent object and the target goods, and therefore the available take-out spacing needs to be corrected.

FIG. 11 is a schematic diagram II showing the positional relationship between target goods and adjacent objects in the embodiment of FIG. 9 of the present disclosure. In another possible mode of implementation, as shown in FIG. 11, the adjacent object is at a non-ideal pose and the target goods are at an ideal pose, step S603 includes the following three implementation steps:

step S6031, determining, according to the pose information of the adjacent object, a second spatial correction amount, the second spatial correction amount being used for representing the amount of change in distance between the target goods and the adjacent objects caused by a change in the placement posture of the adjacent object;

step S6032, determining, according to the position information of the adjacent object and the second spatial correction amount, corrected position information of the adjacent object; and step S6033, determining, according to the corrected position information and the contour position information of the target goods, the available take-out spacing between the target goods and the adjacent object.

Exemplarily, as shown in FIG. 11, a second spatial correction amount R2_1 is used for representing the change in the first available take-out spacing between the target goods and the adjacent object A caused by the inclined placement of the adjacent object A, and more specifically, that is, consequently, the distance between the adjacent object A and the target goods is reduced. Of course, it will be understood that in another possible mode of implementation, when the adjacent object B is also in the case of inclined placement, then the second spatial correction amount further includes R2_2 (not shown in the figure) for representing the change in the second available take-out spacing between the target goods and the adjacent object B caused by the inclined placement of the adjacent object B. In this case, the positional relationship between the adjacent object and the target goods is described in detail similarly in the above-described embodiment, and will not be repeated herein.

Further, according to the second spatial correction amount, the position information of the adjacent object is corrected, and the corrected position information corresponding to the adjacent object can be determined, namely, the position information of the available take-out spacing is actually determined for the adjacent object, for example, the coordinate of the point of the adjacent object closest to the target goods. Furthermore, according to the corrected position information and the contour position information of the target goods, the distance between the adjacent object and the target goods is calculated, i.e., the available take-out space can be obtained. Since the determination process of the available take-out spacing takes into account the pose information of the adjacent object, it is possible to avoid the error caused by the adjacent object being at a non-ideal pose, improve the accuracy of judging the available take-out spacing and improve the safety in the operation process of taking out goods.

Figure 12:
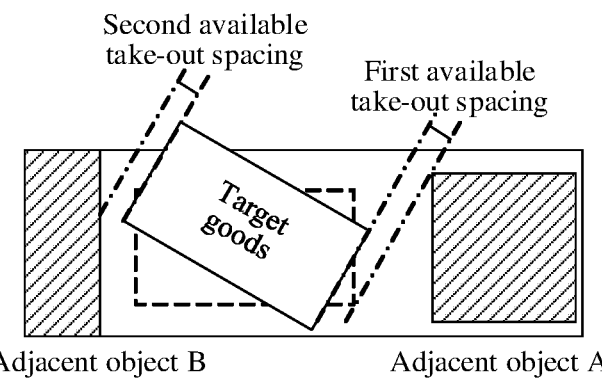
FIG. 12 is a schematic diagram III showing the positional relationship between target goods and adjacent objects in the embodiment of FIG. 9 of the present disclosure.

FIG. 12 is a schematic diagram III showing the positional relationship between target goods and adjacent objects in the embodiment of FIG. 9 of the present disclosure. In yet another possible mode of implementation, as shown in FIG. 12, the adjacent object is at an ideal pose, the target goods are at a non-ideal pose, and then step S603 includes the following three implementation steps:

step S603 includes the following three implementation steps:

step S6034, determining, according to the pose information of the target goods, a third spatial correction amount, the third spatial correction amount being used for representing the amount of change in distance between the target goods and the adjacent objects caused by a change in the placement posture of the target goods;

step S6035, determining, according to the third spatial correction amount, corrected contour position information of the target goods; and step S6036, determining, according to the corrected contour position information of the target goods and the position information of the adjacent object, the available take-out spacing between the target goods and the adjacent object.

Exemplarily, as shown in FIG. 12, the third spatial correction amount includes R3_1 (not shown in the figure) and R3_2 (not shown in the figure). The third spatial correction amount R3_1 is used for representing the change in the first available take-out spacing between the target goods and the adjacent object A caused by the inclined placement of the target goods, and more specifically, that is, consequently, the distance between the adjacent object A and the target goods is reduced. The third spatial correction amount R3_2 is used for representing the change in the second available take-out spacing between the target goods and the adjacent object B caused by the inclined placement of the target goods, more specifically, that is, consequently, the distance between the adjacent object B and the target goods is reduced. Therefore, when the pose of the target goods is in a non-ideal state, the positional relationship of the contour position of the target goods with respect to the position of the adjacent object changes. Therefore, according to the third spatial correction amount, the contour position of the target goods can be corrected to determine corrected contour position information of the target goods.

Further, by correcting the contour position information and the position information of the adjacent object, available spacing between the target goods and the adjacent object can be determined. Since the determination process of the available take-out spacing takes into account the pose information of the target goods, it is possible to avoid the error caused by the target goods being at a non-ideal pose, improve the accuracy of judging the available take-out spacing and improve the safety in the process of taking out goods.

Figure 13:
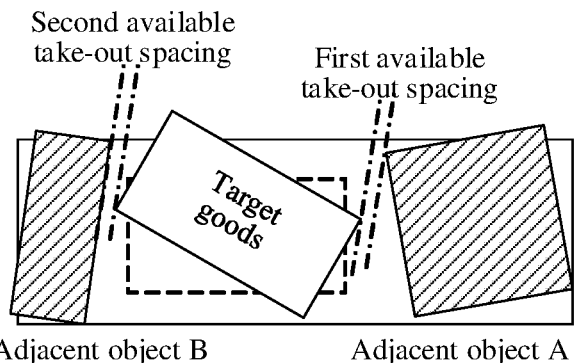
FIG. 13 is a schematic diagram IV showing the positional relationship between target goods and adjacent objects in the embodiment of FIG. 9 of the present disclosure.

FIG. 13 is a schematic diagram IV showing the positional relationship between target goods and adjacent objects in the embodiment of FIG. 9 of the present disclosure. In yet another possible mode of implementation, as shown in FIG. 13, the adjacent object is at a non-ideal pose, the target goods are at a non-ideal pose, at this moment, in conjunction with the embodiments corresponding to FIG. 11 and FIG. 12, steps of S603 are implemented, that is:

step S6031, determining, according to the pose information of the adjacent object, a second spatial correction amount, the second spatial correction amount being used for representing the amount of change in distance between the target goods and the adjacent objects caused by a change in the placement posture of the adjacent object;

step S6032, determining, according to the position information of the adjacent object and the second spatial correction amount, corrected position information of the adjacent object; and step S6034, determining, according to the pose information of the target goods, a third spatial correction amount, the third spatial correction amount being used for representing the amount of change in distance between the target goods and the adjacent objects caused by a change in the placement posture of the target goods;

step S6035, determining, according to the third spatial correction amount, corrected contour position information of the target goods; and step S6037, determining, according to the corrected contour position information of the target goods and the corrected position information of the adjacent object, the available take-out spacing between the target goods and the adjacent object.

The mode of implementation of steps S6031 to S6037 has been described in detail in the above-described embodiments as shown in FIGS. 9 to 12, and will not be repeated herein.

In the embodiment of the present application, by acquiring the position information and the pose information of the target goods, the position information and the pose information of the adjacent goods are acquired, the available take-out spacing between the target goods and the adjacent goods is determined, and since the influence of the position and pose factors of the target goods and the adjacent goods on the available take-out spacing is considered, the accuracy of evaluating the available take-out spacing is improved, and the safety of the control operation for taking out goods is improved.

Further, Optionally, determining the available take-out spacing, further includes:

acquiring environmental error information, the environmental error information being used for representing the effect of the environment in which the warehousing robot is located on the available take-out spacing; and correcting, according to the environmental error information, the available take-out spacing.

Specifically, the environmental error information includes rack tilt, mechanical errors of the robot itself, ground unevenness, box surface unevenness, sensor errors, algorithm calculation errors and other information. The environmental error information is obtained after performing measurement or test in advance, and pre-stored in the warehousing robot, or pre-stored in a server, and the warehousing robot acquires same through the server. According to the pre-acquired environmental error information, the available storage spacing is corrected, further improving the accuracy of the available storage spacing, and improving the control safety in the goods take-out process.

Step S604: Adjust a position of the carrying device, and/or adjusting an angle of the carrying device, and/or control a chassis of the warehousing robot to move, and control the carrying device to take out the target goods according to the first state information in a case that the available take-out spacing is greater than or equal to a take-out spacing threshold.

If the available take-out spacing is greater than or equal to the take-out spacing threshold, it indicates that the robotic arm may extend into the space between the target goods and the adjacent object to perform the operation of taking out goods. Further, the operation position and angle of the robotic arm are adjusted according to the first state information, i.e., the position information and the pose information of the target goods, and/or the chassis of the warehousing robot is controlled to move so that the robotic arm takes out the target goods at a position and angle matched with the available take-out spacing.

The operation process of taking out the target goods will now be described in a more specific embodiment.

Figure 14:
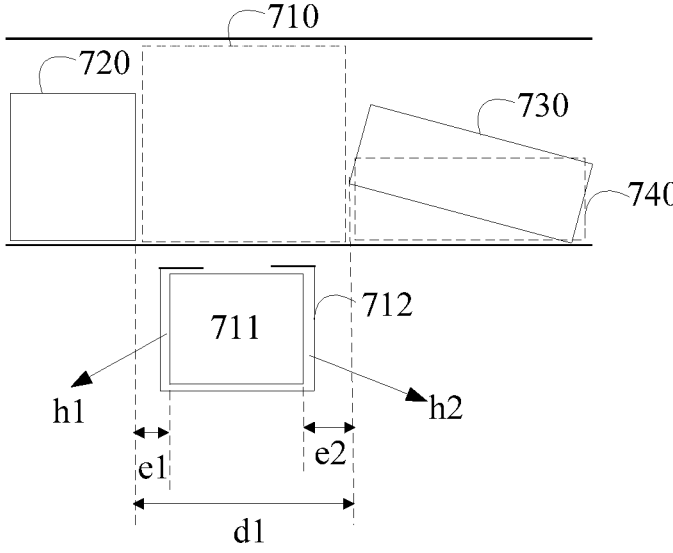
FIG. 14 is a schematic diagram for taking out target goods in the embodiment as shown in FIG. 9 of the present disclosure.

Exemplarily, FIG. 14 is a schematic diagram for taking out target goods in the embodiment as shown in FIG. 9 of the present disclosure. FIG. 14 illustrates two adjacent objects of the dynamic goods storage space. The adjacent object on the left side of the dynamic goods storage space 710 is an adjacent object 720 and the adjacent object on the right side of the dynamic goods storage space 710 is an adjacent object 730, target goods 711 are placed on a carrying device of the warehousing robot, for example, the carrying device is a robotic arm 712. It can be seen from FIG. 14 that the placement pose of the adjacent object 720 is a preset pose in an ideal state, while the placement pose of the adjacent object 730 is not in an ideal state and deflects. In FIG. 14, an adjacent object 740 denotes the placement state of the adjacent object 730 in an ideal state, and then the distance between the adjacent object 720 and the adjacent object 730, i.e., object spacing dl, is determined according to the position information and the pose information of the adjacent object 720 and the adjacent object 730, and then according to the size information of the target goods 711, specifically the width, available take-out spacing e1 and available take-out spacing e2 that can be left after assuming that the target goods 711 are placed on the dynamic goods storage space are determined, spacing between the robotic arm 712 and the target goods 711 is ignored, when the difference between the available take-out spacing e1 and the reserved safe spacing f1 corresponding to the adjacent object 720 is greater than the thickness h1 of the left arm of the robotic arm 712, and the difference between the available take-out spacing e2 and the reserved safe spacing f2 corresponding to the adjacent object 730 is greater than the thickness h2 of the right arm of the robotic arm 712, then, it is determined that each available take-out spacing satisfies the goods take-out condition, and then the robotic arm is controlled to perform the take-out operation of the target goods.

In another possible mode of implementation, the carrying device may also be a suction cup, the suction cup moves the target goods by being sucked to the front of the target goods, so that the suction cup can be extended into the robotic arm to clamp the target goods without large available take-put spacing, while only ensuring that the available take-out spacing is sufficient for taking out the target goods without colliding with adjacent objects. In the scenario where the carrying device is a suction cup, if it is judged that the available spacing is less than a storage spacing threshold, it indicates that the target goods cannot be placed in the corresponding dynamic goods storage space.

In this embodiment, For the case where the target goods are taken out, before the warehousing robot takes out the target goods onto the dynamic goods storage space on the basis of the take-out instruction, according to the position information of the adjacent objects of the dynamic goods storage space, which may be adjacent objects or rack stand columns, and the pose information of the adjacent objects, in conjunction with the size information of the target goods, the spacing between the target goods and each adjacent object is determined, and when each spacing satisfies the take-out condition of the target goods, the target goods are placed on the dynamic goods storage space, avoiding the situation that due to the fact that the dynamic goods storage space is too small, the target goods are damaged when being taken out, and even the rack topples and falls, which improves the safety of taking out goods.

Figures 15, 16, 17:
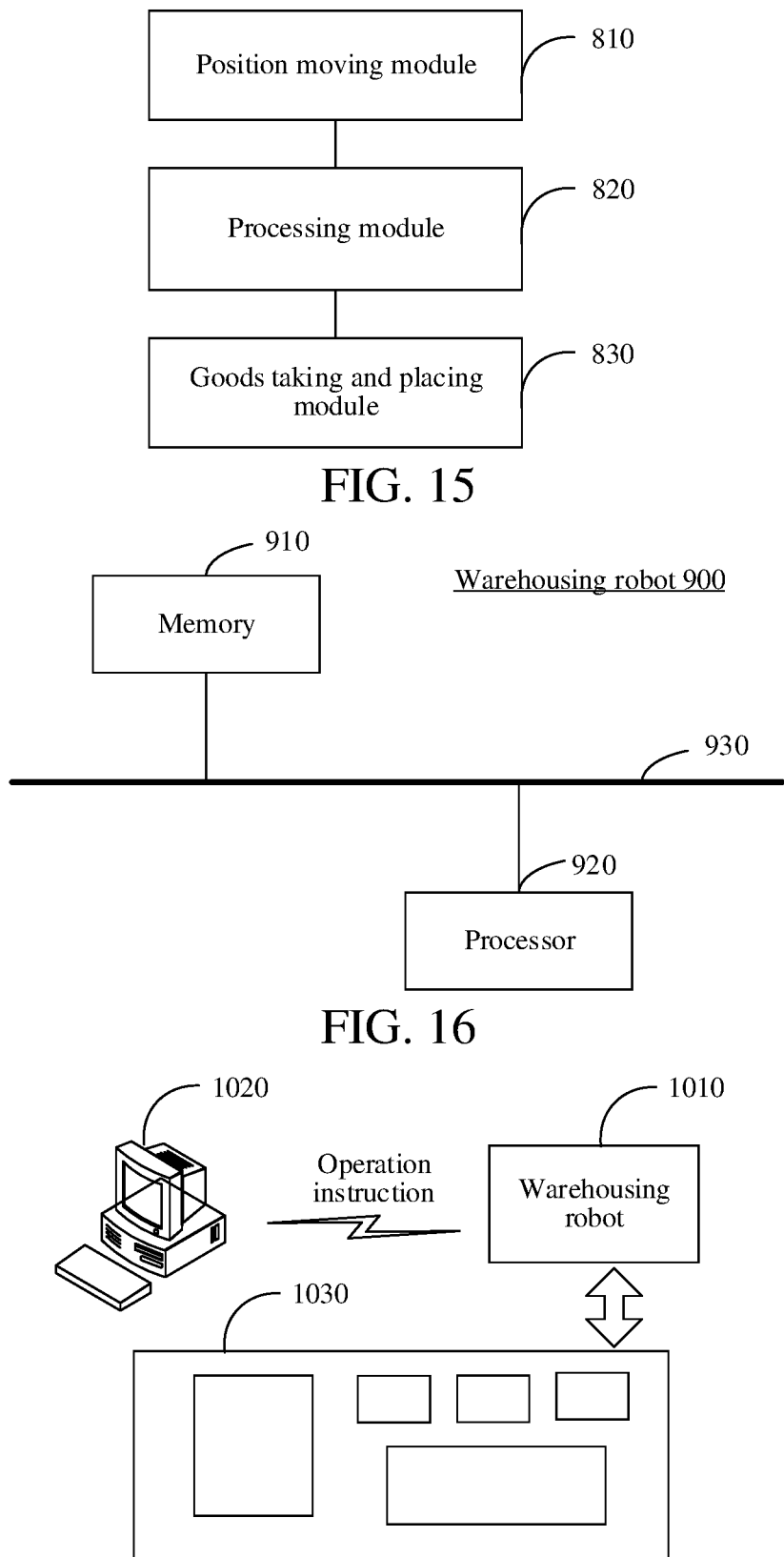
FIG. 15 is a schematic structural diagram of a device for taking out and placing goods provided by an embodiment of the present disclosure.
FIG. 16 is a schematic structural diagram of a warehousing robot provided by an embodiment of the present disclosure.
FIG. 17 is a schematic structural diagram of a warehousing system provided by an embodiment of the present disclosure.

FIG. 15 is a schematic structural diagram of a device for taking out and placing goods provided by an embodiment of the present disclosure; as shown in FIG. 15, the device 800 for taking out and placing goods includes: a position moving module 810, a processing module 820 and a goods taking and placing module 830.

The position moving module 810 is configured to move, according to an operation instruction for target goods, to a target position, where the target position is a position corresponding to a dynamic goods storage space for the target goods; the processing module 820 is configured to acquire first state information and second state information, and determining, according to the first state information and the second state information, available spacing between the target goods and adjacent objects; where the first state information is used for representing a spatial position feature of the target goods and the second state information is used for representing spatial position features of the adjacent objects; and the goods taking and placing module 830 is configured to take out or store, according to the available spacing, the target goods.

Optionally, the available spacing includes available storage spacing, the available storage spacing being used for representing the spatial size available for storing the target goods at the dynamic goods storage space. The first state information includes boundary size information of the target goods, the second state information includes position information of the adjacent object, and the processing module 820 is specifically configured to: determine, according to the position information of the adjacent object, spatial distance information, where the spatial distance information is used for representing a distance between the adjacent objects on both sides of the target goods; and determine, according to the spatial distance information and the boundary size information, the available storage spacing.

Optionally, the second state information further includes pose information of the adjacent object, the pose information being used for representing the placement posture of the object. In response to determining, according to the position information of the adjacent object, the spatial distance information, the processing module 820 is specifically configured to determine, according to the pose information of the adjacent object, a first spatial correction amount, the first spatial correction amount being used for representing an amount of change in a distance between the adjacent objects on both sides of the target goods caused by a change in the placement postures of the adjacent objects; and determine, according to the position information of the adjacent objects and the first spatial correction amount, the spatial distance information.

Optionally, in response to determining, according to the pose information of the adjacent object, the first spatial correction amount, the processing module 820 is specifically configured to acquire preset reference pose information, the reference pose information being used for representing standard placement postures of the adjacent objects; and determine, according to an amount of change of the reference pose information and the pose information of the adjacent objects, the first spatial correction amount.

Optionally, the second state information further includes size information of the adjacent objects, and in response to determining, according to the position information of the adjacent objects, the spatial distance information, the processing module 820 is specifically configured to determine, according to the position information of the adjacent objects and the size information of the adjacent objects, contour position information of the adjacent objects on both sides of the target goods; and determine, according to the contour position information of the adjacent objects on both sides of the target goods, the spatial distance information.

Optionally, the goods taking and placing module 830 is specifically configured to control the robotic arm to place the target goods at a reference position in the dynamic goods storage space in a case that the available spacing is greater than or equal to a storage spacing threshold, where the reference position is used for indicating the position of the target goods in the dynamic goods storage space such that a distance from the target goods to the adjacent objects is less than or equal to a preset distance threshold.

Optionally, the available spacing includes available take-out spacing, the available take-out spacing being used for representing a spatial size available for the robotic arm to take out the target goods at the dynamic goods storage space. The first state information includes position information of the target goods and the second state information includes position information of the adjacent objects. The processing module 820 is specifically configured to determine, according to the position information of the target goods, contour position information of the target goods; and determine, according to the contour position information of the target goods and the position information of the adjacent objects, the available take-out spacing between the target goods and the adjacent objects.

Optionally, the second state information further includes pose information of the adjacent objects, the pose information being used for representing the placement posture of the object, and in response to determining, according to the contour position information of the target goods and the position information of the adjacent objects, the available take-out spacing between the target goods and the adjacent objects, the processing module 820 is specifically configured to determine, according to the pose information of the adjacent objects, a second spatial correction amount, the second spatial correction amount being used for representing an amount of change in a distance between the target goods and the adjacent objects caused by a change in the placement posture of the adjacent object; determine, according to the position information of the adjacent objects and the second spatial correction amount, corrected position information of the adjacent objects; and determine, according to the corrected position information and the contour position information of the target goods, the available take-out spacing between the target goods and the adjacent objects.

Optionally, the second state information further includes size information of the adjacent objects, and in response to determining, according to the contour position information and the position information of the adjacent objects, the available spacing between the target goods and the adjacent objects, the processing module 820 is specifically configured to determine, according to the position information of the adjacent objects and the size information of the adjacent objects, contour position information of the adjacent objects; and determine, according to the contour position information of the adjacent objects and the contour position information of the target goods, the spatial distance information.

Optionally, the first state information further includes pose information of the target goods, the pose information being used for representing the placement posture of the object, and in response to determining, according to the contour position information of the target goods and the position information of the adjacent objects, the available take-out spacing between the target goods and the adjacent objects, the processing module 820 is specifically configured to determine, according to the pose information of the target goods, a third spatial correction amount, the third spatial correction amount being used for representing an amount of change in a distance between the target goods and the adjacent objects caused by a change in the placement posture of the target goods; determine, according to the third spatial correction amount, corrected contour position information of the target goods; and determine, according to the corrected contour position information of the target goods and the position information of the adjacent object, the available take-out spacing between the target goods and the adjacent objects.

Optionally, the goods taking and placing module 830 is specifically configured to adjust a position of the robotic arm, and/or adjust an angle of the robotic arm, and/or control a chassis of the warehousing robot to move according to the first state information in a case that the available take-out spacing is greater than or equal to a take-out spacing threshold; and control the robotic arm to take out the target goods.

Optionally, the processing module 820 is further configured to acquire environmental error information, the environmental error information being used for representing the effect of an environment in which the warehousing robot is located on the available spacing; and correct, according to the environmental error information, the available spacing.

Optionally, in response to acquiring the first state information and the second state information, the processing module 820 is specifically configured to collect sensing information at the target position by means of a sensor disposed on the warehousing robot; and perform feature recognition on the sensing information to acquire the first state information and the second state information.

Optionally, the sensing information includes at least one of image information, infrared ranging information, and laser ranging information.

The device for taking out and placing goods provided by the embodiment of the present disclosure can perform the method for taking out and placing goods provided by any embodiment of the present disclosure, and has corresponding functional modules for performing the method and beneficial effects.

FIG. 16 is a schematic structural diagram of a warehousing robot provided by an embodiment of the present disclosure; as shown in FIG. 16, the warehousing robot 900 includes a memory 910, a processor 920 and a computer program.

The computer program is stored in the memory 910 and configured to be executed by the processor 920 to implement the method for taking out and placing goods provided by any one of the embodiments corresponding to FIGS. 2-14 of the present disclosure.

The memory 910 and the processor 920 are connected via a bus 930.

The relevant illustration may be understood with reference to the relevant description and effects of the steps of FIGS. 2-14, and will not be repeated here.

Of course, the warehousing robot includes a carrying device for taking out and storing goods; a moving device for moving according to a relevant instruction; and a rack for temporary storage of goods. The carrying device may be a robotic arm including a left arm and a right arm.

FIG. 17 is a schematic structural diagram of a warehousing system provided by an embodiment of the present disclosure; as shown in FIG. 17, the warehousing system includes: a warehousing robot 1010, a warehouse management apparatus 1020 and a rack 1030.

The rack 1030 is configured to store various goods, including target goods. The warehousing robot 1010 is a warehousing robot provided by the embodiment as shown in FIG. 16 of the present disclosure. The warehouse management apparatus 1020 is configured to generate an operation instruction for the target goods and transmit the operation instruction to the warehousing robot 1010 so that the warehousing robot 1010 performs operation on the basis of the operation instruction.

An embodiment of the present disclosure provides a computer-readable storage medium on which a computer program is stored, the computer program being executed by a processor to implement the method for taking out and placing goods provided by any one of the embodiments corresponding to FIGS. 2-14 of the present disclosure.

The computer-readable storage medium may be a ROM, a random-access memory (RAM), a CD-ROM, a magnetic tape, a floppy disk, an optical data storage device and the like.

In several embodiments provided by the present disclosure, it should be understood that the disclosed device and method may be implemented in other manners. For example, the described device embodiment is merely exemplary. For example, the division of the modules is merely a logical function division and may be other division during actual implementation. For example, a plurality of modules may be combined or integrated into another system, or some features may be ignored or not performed. In another aspect, the coupling or direct coupling or communication connection shown or discussed with respect to each other may be indirect coupling or communication connection through some interfaces, apparatuses, or modules, and may be in electrical, mechanical, or other forms.

The modules illustrated as separate components may be or may not be physically separated, the components shown as modules may be or may not be physical units, i.e., may be located in one place, or may be distributed over a plurality of network elements. Some or all of the modules may be selected according to actual requirements to achieve the objectives of the solutions of this embodiment.

In addition, various functional modules in the embodiments of the present disclosure may be integrated into one processing unit, or each of the modules may exist alone physically, or two or more modules may be integrated into one unit. The above modularized unit may be implemented in the form of hardware and may also be implemented in the form of hardware and software function units.

The above-described integrated module implemented in the form of the software function module may be stored in a computer-readable storage medium. The software function module described above is stored in a storage medium and includes several instructions for instructing a computer device (which may be a personal computer, a server, a network device, or the like) or a processor to perform some of the steps of the method described in the various embodiments of the present disclosure.

It should be understood that the processor described above may be a central processing unit (CPU for short), other general purpose processors, a digital signal processor (DSP for short), an application specific integrated circuit (ASIC for short), etc. The general purpose processor may be a microprocessor or the processor may also be any conventional processor, etc. The steps of the method disclosed in the present invention can be directly implemented and completed by a hardware processor, or implemented and completed by a combination of hardware and software modules in the processor.

The memory may include a high-speed RAM, but may also include a non-volatile memory (NVM), such as at least one magnetic disk memory, and may also be a U disk, a mobile hard disk, a read-only memory, a magnetic disk or an optical disk, etc.

The bus may be an industry standard architecture (ISA for short) bus, a peripheral component interconnection (PCI for short) bus, or an extended industry standard architecture (EISA for short) bus, etc. The bus may be divided into an address bus, a data bus, a control bus, etc. For ease of illustration, the buses in the accompanying drawings of the present disclosure are not limited to only one bus or one type of bus.

The storage medium described above may be implemented by any type of volatile or non-volatile storage devices or combinations thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The storage medium may be any available medium that can be accessed by a general purpose or special purpose computer.

An exemplary storage medium is coupled to the processor such that the processor can read information from the storage medium, and write information into the storage medium. Of course, the storage medium may also be part of the processor. The processor and the storage medium may reside in application specific integrated circuits (ASIC for short). Of course, the processor and the storage medium may reside as discrete components in an electronic device or a main control device.

Those of ordinary skill in the art can understood that all or some of the steps to implement the method embodiments described above may be performed by hardware associated with program instructions. The program described above may be stored in a computer-readable storage medium. The program, when executed, performs steps of the various method embodiments described above; The storage medium described above includes any medium that can store program codes, such as ROM, RAM, a magnetic disk, or an optical disc.

Finally, it should be noted that the foregoing embodiments are merely used for describing the technical solutions of the present disclosure, but are not intended to limit the present disclosure. Although the present disclosure is described in detail with reference to the foregoing embodiments, a person of ordinary skill in the art should understand that, modifications may still be made to the technical solutions in the foregoing embodiments, or equivalent replacements may be made to some or all of the technical features; and these modifications or replacements will not cause the essence of corresponding technical solutions to depart from the scope of the technical solutions in the embodiments of the present disclosure.

What is claimed is:

1. A method for taking out and placing goods, the method being applied to a warehousing robot, the method comprising:

moving, according to an operation instruction for target goods, to a target position, wherein the target position is a position corresponding to a dynamic goods storage space for the target goods;

acquiring first state information and second state information, and determining, according to the first state information and the second state information, available spacing between the target goods and adjacent objects, wherein the first state information is used for representing a spatial position feature of the target goods and the second state information is used for representing spatial position features of the adjacent objects; and taking out or storing, according to the available spacing, the target goods;

wherein the available spacing comprises available storage spacing, the available storage spacing being used for representing a spatial size available for storing the target goods at the dynamic goods storage space; the first state information comprises boundary size information of the target goods and the second state information comprises position information of the adjacent objects; the determining, according to the first state information and the second state information, available spacing between the target goods and the adjacent objects comprises:

determining, according to the position information of the adjacent objects, spatial distance information, wherein the spatial distance information is used for representing a distance between the adjacent objects on both sides of the target goods; and determining, according to the spatial distance information and the boundary size information, the available storage spacing;

wherein the second state information further comprises pose information of the adjacent objects, the pose information being used for representing placement postures of the objects; the determining, according to the position information of the adjacent objects, spatial distance information comprises:

determining, according to the pose information of the adjacent objects, a first spatial correction amount, the first spatial correction amount being used for representing an amount of change in a distance between the adjacent objects on both sides of the target goods caused by a change in the placement postures of the adjacent objects; and determining, according to the position information of the adjacent objects and the first spatial correction amount, the spatial distance information.

2. The method according to claim 1, wherein the warehousing robot comprises a carrying device, the storing, according to the available spacing, the target goods comprises:

controlling the carrying device to place the target goods at a reference position in the dynamic goods storage space in a case that the available spacing is greater than or equal to a storage spacing threshold, wherein the reference position is used for indicating the position of the target goods in the dynamic goods storage space such that a distance from the target goods to the adjacent objects is less than or equal to a preset distance threshold.

3. The method according to claim 1, wherein the warehousing robot comprises a carrying device, the available spacing comprises available take-out spacing, the available take-out spacing being used for representing a spatial size available for the carrying device to take out the target goods at the dynamic goods storage space; the first state information comprises position information of the target goods and the second state information comprises position information of the adjacent objects; the determining, according to the first state information and the second state information, available spacing between the target goods and the adjacent objects comprises:

determining, according to the position information of the target goods, contour position information of the target goods; and determining, according to the contour position information of the target goods and the position information of the adjacent objects, the available take-out spacing between the target goods and the adjacent objects.

4. The method according to claim 3, wherein the second state information further comprises pose information of the adjacent objects, the pose information being used for representing placement postures of the objects, and the determining, according to the contour position information of the target goods and the position information of the adjacent objects, the available take-out spacing between the target goods and the adjacent objects comprises:

determining, according to the pose information of the adjacent objects, a second spatial correction amount, the second spatial correction amount being used for representing an amount of change in a distance between the target goods and the adjacent objects caused by a change in the placement postures of the adjacent objects;

determining, according to the position information of the adjacent objects and the second spatial correction amount, corrected position information of the adjacent objects; and determining, according to the corrected position information and the contour position information of the target goods, the available take-out spacing between the target goods and the adjacent objects.

5. The method according to claim 3, wherein the second state information further comprises size information of the adjacent objects, and the determining, according to the contour position information of the target goods and the position information of the adjacent objects, the available take-out spacing between the target goods and the adjacent object comprises:

determining, according to the position information of the adjacent objects and the size information of the adjacent objects, contour position information of the adjacent objects; and determining, according to the contour position information of the adjacent objects and the contour position information of the target goods, the available take-out spacing.

6. The method according to claim 3, wherein the first state information further comprises pose information of the target goods, the pose information being used for representing a placement posture of the target goods, and determining, according to the contour position information of the target goods and the position information of the adjacent objects, the available take-out spacing between the target goods and the adjacent objects comprises:

determining, according to the pose information of the target goods, a third spatial correction amount, the third spatial correction amount being used for representing an amount of change in a distance between the target goods and the adjacent objects caused by a change in the placement posture of the target goods;

determining, according to the third spatial correction amount, corrected contour position information of the target goods; and determining, according to the corrected contour position information of the target goods and the position information of the adjacent objects, the available take-out spacing between the target goods and the adjacent objects.

7. The method according to claim 6, wherein the taking out, according to the available spacing, the target goods comprises:

adjusting a position of the carrying device, and/or adjusting an angle of the carrying device, and/or controlling a chassis of the warehousing robot to move according to the first state information in a case that the available take-out spacing is greater than or equal to a take-out spacing threshold; and controlling the carrying device to take out the target goods.

8. The method according to claim 1, wherein the determining, according to the pose information of the adjacent objects, the first spatial correction amount comprises:

acquiring preset reference pose information, the reference pose information being used for representing standard placement postures of the adjacent objects; and determining, according to an amount of change of the reference pose information and the pose information of the adjacent objects, the first spatial correction amount.

9. The method according to claim 1, wherein the method further comprises:

acquiring environmental error information, the environmental error information being used for representing the effect of an environment in which the warehousing robot is located on the available spacing; and correcting, according to the environmental error information, the available spacing.

10. A warehousing robot, comprising: a memory and at least one processor, wherein the memory is configured to store computer-executable instructions;

the at least one processor is configured to execute the computer-executable instructions stored in the memory, wherein the computer-executable instructions comprise:

moving, according to an operation instruction for target goods, to a target position, wherein the target position is a position corresponding to a dynamic goods storage space for the target goods;

acquiring first state information and second state information, and determining, according to the first state information and the second state information, available spacing between the target goods and adjacent objects, wherein the first state information is used for representing a spatial position feature of the target goods and the second state information is used for representing spatial position features of the adjacent objects; and taking out or storing, according to the available spacing, the target goods;

wherein the warehousing robot comprises a carrying device, the available spacing comprises available take-out spacing, the available take-out spacing being used for representing a spatial size available for the carrying device to take out the target goods at the dynamic goods storage space; the first state information comprises position information of the target goods and the second state information comprises position information of the adjacent objects; and the computer-executable instructions comprise:

determining, according to the position information of the target goods, contour position information of the target goods; and determining, according to the contour position information of the target goods and the position information of the adjacent objects, the available take-out spacing between the target goods and the adjacent objects;

wherein the second state information further comprises pose information of the adjacent objects, the pose information being used for representing placement postures of the objects, and the computer-executable instructions comprise:

determining, according to the pose information of the adjacent objects, a second spatial correction amount, the second spatial correction amount being used for representing an amount of change in a distance between the target goods and the adjacent objects caused by a change in the placement postures of the adjacent objects;

determining, according to the position information of the adjacent objects and the second spatial correction amount, corrected position information of the adjacent objects; and determining, according to the corrected position information and the contour position information of the target goods, the available take-out spacing between the target goods and the adjacent objects.

11. The warehousing robot according to claim 10, wherein the available spacing comprises available storage spacing, the available storage spacing being used for representing a spatial size available for storing the target goods at the dynamic goods storage space; the first state information comprises boundary size information of the target goods and the second state information comprises position information of the adjacent objects; and the computer-executable instructions comprise:

determining, according to the position information of the adjacent objects, spatial distance information, wherein the spatial distance information is used for representing a distance between the adjacent objects on both sides of the target goods; and determining, according to the spatial distance information and the boundary size information, the available storage spacing.

12. The warehousing robot according to claim 11, wherein the second state information further comprises pose information of the adjacent objects, the pose information being used for representing placement postures of the objects; and the computer-executable instructions comprise:

determining, according to the pose information of the adjacent objects, a first spatial correction amount, the first spatial correction amount being used for representing an amount of change in a distance between the adjacent objects on both sides of the target goods caused by a change in the placement postures of the adjacent objects; and determining, according to the position information of the adjacent objects and the first spatial correction amount, the spatial distance information.

13. The warehousing robot according to claim 11, wherein the second state information further comprises size information of the adjacent objects, and the computer-executable instructions comprise:

determining, according to the position information of the adjacent objects and the size information of the adjacent objects, contour position information of the adjacent objects on both sides of the target goods; and determining, according to the contour position information of the adjacent objects on both sides of the target goods, the spatial distance information.

14. The warehousing robot according to claim 12, wherein the computer-executable instructions comprise:

acquiring preset reference pose information, the reference pose information being used for representing standard placement postures of the adjacent objects; and determining, according to an amount of change of the reference pose information and the pose information of the adjacent objects, the first spatial correction amount.

15. The warehousing robot according to claim 11, wherein the computer-executable instructions comprise:

controlling the carrying device to place the target goods at a reference position in the dynamic goods storage space in a case that the available spacing is greater than or equal to a storage spacing threshold, wherein the reference position is used for indicating the position of the target goods in the dynamic goods storage space such that a distance from the target goods to the adjacent objects is less than or equal to a preset distance threshold.

16. A non-transitory computer-readable storage medium, comprising: program code, wherein when a computer runs the computer program product, the program code is executed, and the program code comprises computer-executable instructions; wherein the computer-executable instructions comprise controlling a warehousing robot to:

move, according to an operation instruction for target goods, to a target position, wherein the target position is a position corresponding to a dynamic goods storage space for the target goods;

acquire first state information and second state information, and determine, according to the first state information and the second state information, available spacing between the target goods and adjacent objects, wherein the first state information is used for representing a spatial position feature of the target goods and the second state information is used for representing spatial position features of the adjacent objects; and take out or store, according to the available spacing, the target goods;

wherein the warehousing robot comprises a carrying device, the available spacing comprises available take-out spacing, the available take-out spacing being used for representing a spatial size available for the carrying device to take out the target goods at the dynamic goods storage space; the first state information comprises position information of the target goods and the second state information comprises position information of the adjacent objects; and the computer-executable instructions comprise controlling the warehousing robot to:

determine, according to the position information of the target goods, contour position information of the target goods; and determine, according to the contour position information of the target goods and the position information of the adjacent objects, the available take-out spacing between the target goods and the adjacent objects;

wherein the first state information further comprises pose information of the target goods, the pose information being used for representing a placement posture of the target goods; and the computer-executable instructions comprise controlling the warehousing robot to:

determine, according to the pose information of the target goods, a third spatial correction amount, the third spatial correction amount being used for representing an amount of change in a distance between the target goods and the adjacent objects caused by a change in the placement posture of the target goods;

determine, according to the third spatial correction amount, corrected contour position information of the target goods; and determine, according to the corrected contour position information of the target goods and the position information of the adjacent objects, the available take-out spacing between the target goods and the adjacent objects.

17. The non-transitory computer-readable storage medium according to claim 16, wherein the available spacing comprises available storage spacing, the available storage spacing being used for representing a spatial size available for storing the target goods at the dynamic goods storage space; the first state information comprises boundary size information of the target goods and the second state information comprises position information of the adjacent objects; and the computer-executable instructions comprise controlling the warehousing robot to:

determine, according to the position information of the adjacent objects, spatial distance information, wherein the spatial distance information is used for representing a distance between the adjacent objects on both sides of the target goods; and determine, according to the spatial distance information and the boundary size information, the available storage spacing.

18. The non-transitory computer-readable storage medium according to claim 17, wherein the second state information further comprises size information of the adjacent objects, and the computer-executable instructions comprise controlling the warehousing robot to:

determine, according to the position information of the adjacent objects and the size information of the adjacent objects, contour position information of the adjacent objects on both sides of the target goods; and determine, according to the contour position information of the adjacent objects on both sides of the target goods, the spatial distance information.

19. The non-transitory computer-readable storage medium according to claim 17, wherein the second state information further comprises pose information of the adjacent objects, the pose information being used for representing placement postures of the objects; and the computer-executable instructions comprise controlling the warehousing robot to:

determine, according to the pose information of the adjacent objects, a first spatial correction amount, the first spatial correction amount being used for representing an amount of change in a distance between the adjacent objects on both sides of the target goods caused by a change in the placement postures of the adjacent objects; and determine, according to the position information of the adjacent objects and the first spatial correction amount, the spatial distance information.

20. The non-transitory computer-readable storage medium according to claim 17, wherein the computer-executable instructions comprise:

controlling the carrying device to place the target goods at a reference position in the dynamic goods storage space in a case that the available spacing is greater than or equal to a storage spacing threshold, wherein the reference position is used for indicating the position of the target goods in the dynamic goods storage space such that a distance from the target goods to the adjacent objects is less than or equal to a preset distance threshold.

* * * * *